US012712308B2

(12) United States Patent
Decrock et al.

(10) Patent No.: US 12,712,308 B2
(45) Date of Patent: Aug. 18, 2026

(54) HIGH-SPEED ELECTRICAL CONNECTOR HAVING A GROUND BUS

(71) Applicants: TE Connectivity Belgium BV, Oostkamp (BE); TE Connectivity Solutions GmbH, Schaffhausen (CH)

(72) Inventors: Lieven Decrock, Roeselare (BE); Dustin Grant Rowe, Harrisburg, PA (US); Michael John Phillips, Camp Hill, PA (US)

(73) Assignees: TE CONNECTIVITY SOLUTIONS GmbH, Schaffhausen (CH); TE CONNECTIVITY BELGIUM BV, Oostkamp (BE)

( * ) Notice: Subject to any disclaimer, the term of this patent is extended or adjusted under 35 U.S.C. 154(b) by 382 days.

(21) Appl. No.: 18/460,844

(22) Filed: Sep. 5, 2023

(65) Prior Publication Data

US 2024/0128674 A1 Apr. 18, 2024

Related U.S. Application Data

(60) Provisional application No. 63/416,033, filed on Oct. 14, 2022.

(51) Int. Cl.
*H01R 13/424* (2006.01)
*H01R 12/72* (2011.01)
(Continued)

(52) U.S. Cl.
CPC ......... *H01R 13/424* (2013.01); *H01R 12/724* (2013.01); *H01R 12/73* (2013.01); *H01R 13/6581* (2013.01)

(58) Field of Classification Search
CPC .... H01R 12/724; H01R 12/73; H01R 13/424; H01R 13/6581
(Continued)

(56) References Cited

U.S. PATENT DOCUMENTS 9,692,183 B2 * 6/2017 Phillips .............. H01R 13/6471
10,367,308 B2 * 7/2019 Little .................. H01R 4/2404
(Continued)

FOREIGN PATENT DOCUMENTS

CN 214957657 U * 11/2021 ......... H01R 13/6599
CN 217036206 U * 7/2022 ......... H01R 13/6585
(Continued)

OTHER PUBLICATIONS

Taiwanese Office Action with English translation thereof, dated Jun. 20, 2024 in Application No. 112138638, 10 pages.

*Primary Examiner* — Abdullah A Riyami

(57) ABSTRACT

A contact assembly includes a contact positioner holding a contact array having contacts and a ground shield including a ground plate along forward sections of the contacts and a ground panel along rearward sections of the contacts. The contact array includes a forward contact holder coupled to the ground plate and the forward sections to locate the forward sections relative to the upper ground plate. The forward contact holder includes forward slots to separate the forward contact holder into discrete sections. The contact array includes a rearward contact holder coupled to the ground panel and the rearward sections to locate the rearward sections relative to the ground panel. The rearward contact holder includes rearward slots to separate the rearward contact holder into discrete sections.

21 Claims, 13 Drawing Sheets

(51) Int. Cl.
*H01R 12/73* (2011.01)
*H01R 13/6581* (2011.01)

(58) Field of Classification Search
USPC ...................................................... 439/607.58
See application file for complete search history.

(56) References Cited

U.S. PATENT DOCUMENTS

| | | | | |
|---|---|---|---|---|
| 10,374,341 | B1 * | 8/2019 | Phillips | H01R 12/73 |
| 10,855,020 | B1 * | 12/2020 | Phillips | H01R 12/721 |
| 11,322,869 | B2 | 5/2022 | Phillips et al. | |
| 2021/0075164 | A1 * | 3/2021 | Chen | H01R 13/2464 |
| 2021/0098927 | A1 * | 4/2021 | Si | H01R 13/6474 |
| 2021/0367361 | A1 * | 11/2021 | Phillips | H01R 13/6585 |
| 2022/0344854 | A1 * | 10/2022 | Huang | H01R 13/6471 |

FOREIGN PATENT DOCUMENTS

| | | | | | |
|---|---|---|---|---|---|
| CN | 222191336 | U | * | 12/2024 | |
| TW | M616449 | U | * | 9/2021 | H01R 13/6461 |
| TW | 202145664 | A | | 12/2021 | |

* cited by examiner

HIGH-SPEED ELECTRICAL CONNECTOR HAVING A GROUND BUS

CROSS REFERENCE TO RELATED APPLICATIONS

This application claims benefit to U.S. Provisional Application No. 63/416,033, filed 14 Oct. 2022, titled "CARD EDGE CONNECTOR", the subject matter of which is herein incorporated by reference in its entirety.

BACKGROUND OF THE INVENTION

The subject matter herein relates generally to card edge connectors of communication systems.

Some communication systems utilize communication connectors, such as card edge connectors to interconnect various components of the system for data communication. Some known communication systems use pluggable modules, such as I/O modules or circuit cards, which are electrically connected to the card edge connectors. The pluggable modules have module circuit boards having card edges that are mated with the card edge connectors during the mating operation. Each card edge connector typically has an upper row of contacts and a lower row of contacts for mating with the corresponding circuit board. There is a need for connectors and circuit boards of communication systems to have greater contact density and/or data throughput. Known card edge connectors are not without disadvantages. For instance, large sections of the contacts are typically rigidly fixed within the connector housing, such as using a contact overmold to hold the contacts relative to each other and relative to the housing. The overmold may negatively affect the electrical characteristics of the signal transmission lines. For example, the plastic material of the overmold creates a path for cross talk between the signal contacts. Properly shielding the signal transmission lines is problematic. Additionally, properly positioning the mating ends and the terminating ends of all of the contacts is difficult to control.

A need remains for a reliable card edge connector.

BRIEF DESCRIPTION OF THE INVENTION

In one embodiment, a contact assembly is provided including a contact positioner holding a contact array having contacts and a ground shield including a ground plate along forward sections of the contacts and a ground panel along rearward sections of the contacts. The contact array includes a forward contact holder coupled to the ground plate and the forward sections to locate the forward sections relative to the upper ground plate. The forward contact holder includes forward slots to separate the forward contact holder into discrete sections. The contact array includes a rearward contact holder coupled to the ground panel and the rearward sections to locate the rearward sections relative to the ground panel. The rearward contact holder includes rearward slots to separate the rearward contact holder into discrete sections.

In another embodiment, a contact assembly is provided and includes a contact positioner having a central wall and a rear wall. The contact positioner includes a front slot at a front of the contact positioner configured to receive a card edge of a module circuit board of a pluggable module. The contact assembly includes an upper contact array coupled to the contact positioner. The upper contact array includes upper contacts. The upper contacts include forward sections extend along the central wall and rearward sections extend along the rear wall. The forward sections of the upper contacts extend to the front slot to mate with the module circuit board. The forward sections and the rearward sections are oriented perpendicular to each other. The upper contact array includes an upper ground shield that have an upper ground plate extend along the forward sections of the upper contacts and an upper ground panel extend along the rearward sections of the upper contacts. The upper ground plate and the upper ground panel are oriented perpendicular to each other. The upper contact array includes an upper forward contact holder and an upper rearward contact holder. The upper forward contact holder coupled to the upper ground plate and coupled to the forward sections of the upper contacts to locate the forward sections of the upper contacts relative to the upper ground plate. The upper forward contact holder includes forward slots to separate the upper forward contact holder into discrete sections. The upper rearward contact holder coupled to the upper ground panel and coupled to the rearward sections of the upper contacts to locate the rearward sections of the upper contacts relative to the upper ground panel. The upper rearward contact holder includes rearward slots to separate the upper rearward contact holder into discrete sections. The contact assembly includes a lower contact array coupled to the contact positioner. The lower contact array includes lower contacts. The lower contacts include forward sections extend along the central wall and rearward sections extend along the rear wall. The forward sections of the lower contacts extend to the front slot to mate with the module circuit board. The forward sections and the rearward sections are oriented perpendicular to each other. The lower contact array includes a lower ground shield has a lower ground plate extend along the forward sections of the lower contacts and a lower ground panel extend along the rearward sections of the lower contacts. The lower ground plate and the lower ground panel are oriented perpendicular to each other. The lower contact array includes a lower forward contact holder and a lower rearward contact holder. The lower forward contact holder coupled to the lower ground plate and coupled to the forward sections of the lower contacts to locate the forward sections of the lower contacts relative to the lower ground plate. The lower forward contact holder includes forward slots to separate the lower forward contact holder into discrete sections. The lower rearward contact holder coupled to the lower ground panel and coupled to the rearward sections of the lower contacts to locate the rearward sections of the lower contacts relative to the lower ground panel. The lower rearward contact holder includes rearward slots to separate the lower rearward contact holder into discrete sections.

In another embodiment, a card edge connector for mating with a pluggable module is provided. The card edge connector includes a housing having a top and a bottom. The housing has a front and a rear. The housing has a first side and a second side. The bottom configured to be mounted to a host circuit board. The housing includes a cavity at the rear. The housing includes a card slot open to the cavity at the front of the housing. The card slot configured to receive a card edge of a module circuit board of the pluggable module. The card edge connector includes a contact assembly is received in the cavity. The contact assembly has a contact positioner holding an upper contact array and a lower contact array. The contact positioner has a central wall and a rear wall. The contact positioner is received in the cavity and coupled to the housing. The contact positioner includes a front slot aligned with the card slot to receive the card edge of the module circuit board. The card edge connector includes an upper contact array coupled to the contact positioner. The upper contact array includes upper contacts. The upper contacts include forward sections extend along the central wall and rearward sections extend along the rear wall. The forward sections of the upper contacts extend to the front slot to mate with the module circuit board. The forward sections and the rearward sections are oriented perpendicular to each other. The upper contact array includes an upper ground shield having an upper ground plate that extend along the forward sections of the upper contacts and an upper ground panel extend along the rearward sections of the upper contacts. The upper ground plate and the upper ground panel are oriented perpendicular to each other. The upper contact array includes an upper forward contact holder and an upper rearward contact holder. The upper forward contact holder coupled to the upper ground plate and coupled to the forward sections of the upper contacts to locate the forward sections of the upper contacts relative to the upper ground plate. The upper forward contact holder includes forward slots to separate the upper forward contact holder into discrete sections. The upper rearward contact holder coupled to the upper ground panel and coupled to the rearward sections of the upper contacts to locate the rearward sections of the upper contacts relative to the upper ground panel. The upper rearward contact holder includes rearward slots to separate the upper rearward contact holder into discrete sections. The card edge connector includes a lower contact array coupled to the contact positioner. The lower contact array includes lower contacts. The lower contacts include forward sections extend along the central wall and rearward sections extend along the rear wall. The forward sections of the lower contacts extend to the front slot to mate with the module circuit board. The forward sections and the rearward sections are oriented perpendicular to each other. The lower contact array includes a lower ground shield has a lower ground plate extend along the forward sections of the lower contacts and a lower ground panel extend along the rearward sections of the lower contacts. The lower ground plate and the lower ground is received oriented perpendicular to each other. The lower contact array includes a lower forward contact holder and a lower rearward contact holder. The lower forward contact holder coupled to the lower ground plate and coupled to the forward sections of the lower contacts to locate the forward sections of the lower contacts relative to the lower ground plate. The lower forward contact holder includes forward slots to separate the lower forward contact holder into discrete sections. The lower rearward contact holder coupled to the lower ground panel and coupled to the rearward sections of the lower contacts to locate the rearward sections of the lower contacts relative to the lower ground panel. The lower rearward contact holder includes rearward slots to separate the lower rearward contact holder into discrete sections.

In a further embodiment, a card edge connector for mating with a pluggable module is provided. The card edge connector is provided and includes a housing having a top and a bottom. The housing has a front and a rear. The housing has a first side and a second side. The bottom configured to be mounted to a host circuit board. The housing includes a cavity at the rear. The housing includes an inner contact channel and an outer contact channel. The inner contact channel closer to the bottom and the host circuit board. The housing includes an inner card slot open to the inner contact channel at the front of the housing. The housing includes an outer card slot open to the outer contact channel at the front of the housing. The inner and outer card slots configured to receive card edges of module circuit boards of the stacked pluggable modules. The card edge connector is provided and includes an inner contact assembly is received in the cavity. The inner contact assembly has an inner contact positioner holding inner contacts. The inner contact positioner is positioned in the inner contact channel aligned with the inner card slot to receive the card edge of the module circuit board. The inner contacts configured to be electrically connected to the host circuit board and configured to be electrically connected to the corresponding module circuit board. The card edge connector is provided and includes an outer contact assembly is received in the cavity. The outer contact assembly has an outer contact positioner holding outer contacts in an upper contact array and a lower contact array. The outer contacts configured to be electrically connected to the host circuit board and configured to be electrically connected to the corresponding module circuit board. The outer contact positioner includes a front slot aligned with the outer card slot to receive the card edge of the corresponding module circuit board. The upper contact array includes upper contacts arranged in pairs, an upper ground shield, and an upper contact holder holding the upper contacts relative to the upper ground shield. The upper contact holder includes slots to separate the upper contact holder into discrete sections each supporting one of the pairs of the upper contacts. The slots located between the pairs of the upper contacts. The lower contact array includes lower contacts arranged in pairs, a lower ground shield, and a lower contact holder holding the lower contacts relative to the lower ground shield. The lower contact holder includes slots to separate the lower contact holder into discrete sections each supporting one of the pairs of the lower contacts. The slots located between the pairs of the lower contacts.

DETAILED DESCRIPTION OF THE INVENTION

Figure 1:
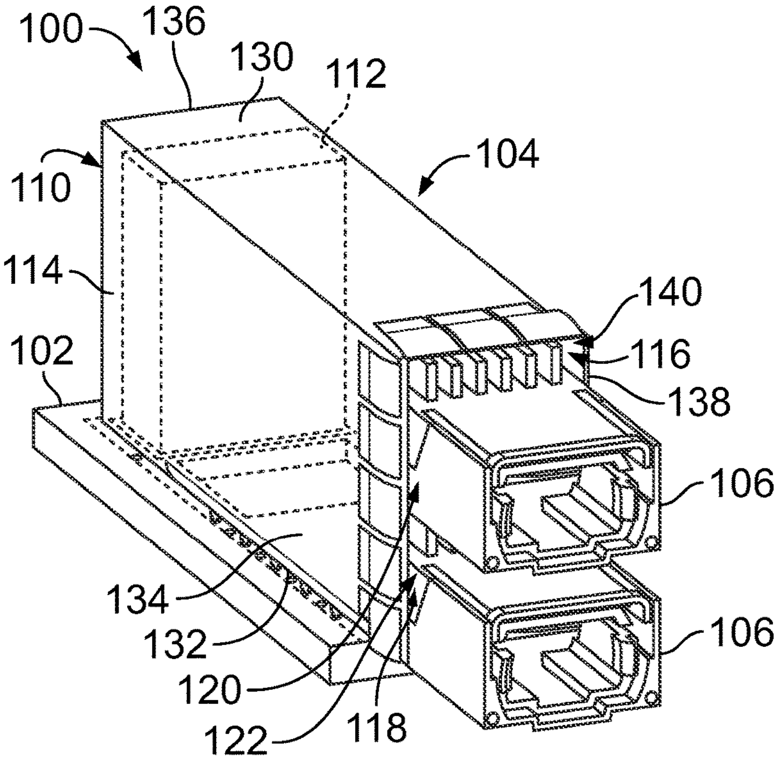
FIG. 1 is a front perspective view of a communication system formed in accordance with an exemplary embodiment.

FIG. 1 is a front perspective view of a communication system 100 formed in accordance with an exemplary embodiment. The communication system 100 includes a circuit board 102 and a receptacle connector assembly 104 mounted to the circuit board 102. Pluggable modules 106 are configured to be electrically connected to the receptacle connector assembly 104. The pluggable modules 106 are electrically connected to the circuit board 102 through the receptacle connector assembly 104.

In an exemplary embodiment, the receptacle connector assembly 104 includes a receptacle cage 110 and an electrical connector assembly 112 (shown in phantom) adjacent the receptacle cage 110. For example, in the illustrated embodiment, the electrical connector assembly 112 is received in the receptacle cage 110. In other various embodiments, the electrical connector assembly 112 may be located rearward of the receptacle cage 110. In various embodiments, the electrical connector assembly 112 is a card edge connector and may be referred to hereinafter as a card edge connector 112.

In various embodiments, the receptacle cage 110 is enclosed and provides electrical shielding for the electrical connector assembly 112. The pluggable modules 106 are loaded into the receptacle cage 110 and are at least partially surrounded by the receptacle cage 110. The receptacle cage 110 includes a plurality of walls 114 that define one or more module channels for receipt of corresponding pluggable modules 106. The walls 114 may be walls defined by solid sheets, perforated walls to allow airflow therethrough, walls with cutouts, such as for a heatsink or heat spreader to pass therethrough, or walls defined by rails or beams with relatively large openings, such as for airflow therethrough. In an exemplary embodiment, the receptacle cage 110 is a shielding, stamped and formed metallic cage member with the walls 114 being shielding walls 114. In other embodiments, the receptacle cage 110 may be open between frame members, such as rails or beams, to provide cooling airflow for the pluggable modules 106 with the frame members of the receptacle cage 110 defining guide tracks for guiding loading of the pluggable modules 106 into the receptacle cage 110.

In the illustrated embodiment, the receptacle cage 110 constitutes a stacked cage member having an upper module channel 116 and a lower module channel 118. The upper module channel 116 is located outward of (further from the host circuit board 102) the lower module channel 118. The lower module channel 118 is located inward of (closer to the host circuit board 102) the upper module channel 116. The receptacle cage 110 has upper and lower module ports 120, 122 that open to the module channels 116, 118 that receive the pluggable modules 106. Any number of module channels may be provided in various embodiments. In the illustrated embodiment, the receptacle cage 110 includes the upper and lower module channels 116, 118 arranged in a single column, however, the receptacle cage 110 may include multiple columns of ganged module channels 116, 118 in alternative embodiments (for example, 2×2, 3×2, 4×2, 4×3, etc.). The receptacle connector assembly 104 is configured to mate with the pluggable modules 106 in both stacked module channels 116, 118. Optionally, multiple electrical connector assemblies 112 may be arranged within the receptacle cage 110, such as when multiple columns of module channels 116, 118 are provided.

In an exemplary embodiment, the walls 114 of the receptacle cage 110 include a top wall 130, a bottom wall 132, and side walls 134 extending between the top wall 130 and the bottom wall 132. The bottom wall 132 may rest on the circuit board 102. However, in alternative embodiments, the bottom wall 132 may be elevated a distance above the circuit board 102 defining a gap below the bottom wall 132, such as for airflow. In other various embodiments, the receptacle cage 110 may be provided without the bottom wall 132. Optionally, the walls 114 of the receptacle cage 110 may include a rear wall 136 and a front wall 138 at the front of the receptacle cage 110. The module ports 120, 122 are provided in the front wall 138. The walls 114 define a cavity 140. For example, the cavity 140 may be defined by the top wall 130, the bottom wall 132, the side walls 134, the rear wall 136 and the front wall 138.

In an exemplary embodiment, other walls 114 may separate or divide the cavity 140 into the various module channels 116, 118. For example, the walls 114 may include a channel separator between the upper and lower module channels 116, 118. The channel separator may form a space between the upper and lower module channels 116, 118, such as for airflow, for a heat sink, for routing light pipes, or for other purposes. For example, the channel separator includes an upper panel, a lower panel and a front panel between the upper and lower panels. In other various embodiments, the walls 114 may include a divider wall extending between the top wall 130 and the bottom wall 132 to separate ganged module channels from each other. The divider walls are parallel to the side walls 134.

In an exemplary embodiment, the receptacle cage 110 may include one or more gaskets at the front wall 138 for providing electrical shielding for the module channels 116, 118. For example, the gaskets may be configured to electrically connect with the pluggable modules 106 received in the corresponding module channels 116, 118. The gaskets may be configured to electrically connect to a panel or bezel.

In an exemplary embodiment, the receptacle connector assembly 104 may include one or more heat sinks for dissipating heat from the pluggable modules 106. For example, the heat sink may be coupled to the top wall 130 for engaging the upper pluggable module 106 received in the upper module channel 116. The heat sink may extend through an opening in the top wall 130 to directly engage the pluggable module 106. Other types of heat sinks may be provided in alternative embodiments.

In an exemplary embodiment, the electrical connector assembly 112 is received in the cavity 140, such as proximate to the rear wall 136. However, in alternative embodiments, the electrical connector assembly 112 may be located behind the rear wall 136 exterior of the receptacle cage 110 and extend into the cavity 140 to interface with the pluggable module(s) 106. In an exemplary embodiment, a single electrical connector assembly 112 is used to electrically connect with the pair of stacked pluggable modules 106 in the upper and lower module channels 116, 118.

In an exemplary embodiment, the pluggable modules 106 are loaded through the front wall 138 to mate with the electrical connector assembly 112. The shielding walls 114 of the receptacle cage 110 provide electrical shielding around the electrical connector assembly 112 and the pluggable modules 106, such as around the mating interfaces between the electrical connector assembly 112 and the pluggable modules 106.

Figure 2:
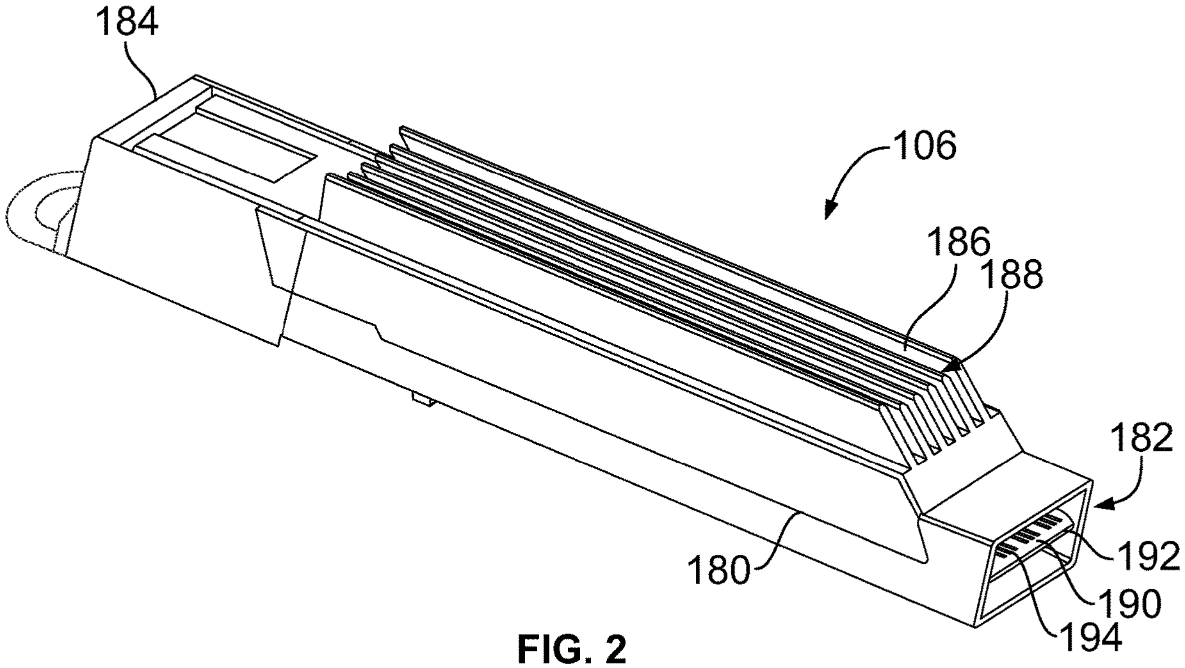
FIG. 2 is a rear perspective view of the pluggable module in accordance with an exemplary embodiment.

FIG. 2 is a rear perspective view of the pluggable module 106 in accordance with an exemplary embodiment. The pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 and an opposite front end 184. The mating end 182 is configured to be inserted into the corresponding module channel 116 or 118 (shown in FIG. 1). The front end 184 may be a cable end having a cable extending therefrom to another component within the system.

The pluggable module 106 includes a module circuit board 190 that is configured to be communicatively coupled to the electrical connector assembly 112 (shown in FIG. 1). The module circuit board 190 may be accessible at the mating end 182. The module circuit board 190 has a card edge 192 extending between a first or upper surface and a second or lower surface at a mating end of the module circuit board 190. The module circuit board 190 includes mating contacts 194, such as pads or circuits, at the card edge 192 configured to be mated with the card edge connector 112. In an exemplary embodiment, the mating contacts 194 are provided on the upper surface and the lower surface. The module circuit board 190 may include components, circuits and the like used for operating and or using the pluggable module 106. For example, the module circuit board 190 may have conductors, traces, pads, electronics, sensors, controllers, switches, inputs, outputs, and the like associated with the module circuit board 190, which may be mounted to the module circuit board 190, to form various circuits.

In other various embodiments, the pluggable module 106 may be a circuit card rather than an I/O module. For example, the pluggable module 106 may include the module circuit board 190 without the pluggable body 180 surrounding the module circuit board 190.

In an exemplary embodiment, the pluggable body 180 provides heat transfer for the module circuit board 190, such as for the electronic components on the module circuit board 190. For example, the module circuit board 190 is in thermal communication with the pluggable body 180 and the pluggable body 180 transfers heat from the module circuit board 190. In an exemplary embodiment, the pluggable body 180 includes a plurality of heat transfer fins 186 along at least a portion of the outer perimeter of the pluggable module 106. The fins 186 transfer heat away from the main shell of the pluggable body 180, and thus from the module circuit board 190 and associated components. The fins 186 are separated by gaps 188 that allow airflow or other cooling flow along the surfaces of the fins 186 to dissipate the heat therefrom. In the illustrated embodiment, the fins 186 are parallel plates that extend lengthwise; however, the fins 186 may have other shapes in alternative embodiments, such as cylindrical or other shaped posts. The pluggable module 106 may be provided without the heat transfer fins 186 in alternative embodiments.

In alternative embodiments, the pluggable module 106 may be provided without the pluggable body 180. For example, the pluggable module 106 may simply include the module circuit board 190. For example, the module circuit board 190 may be a paddle card.

Figure 3:
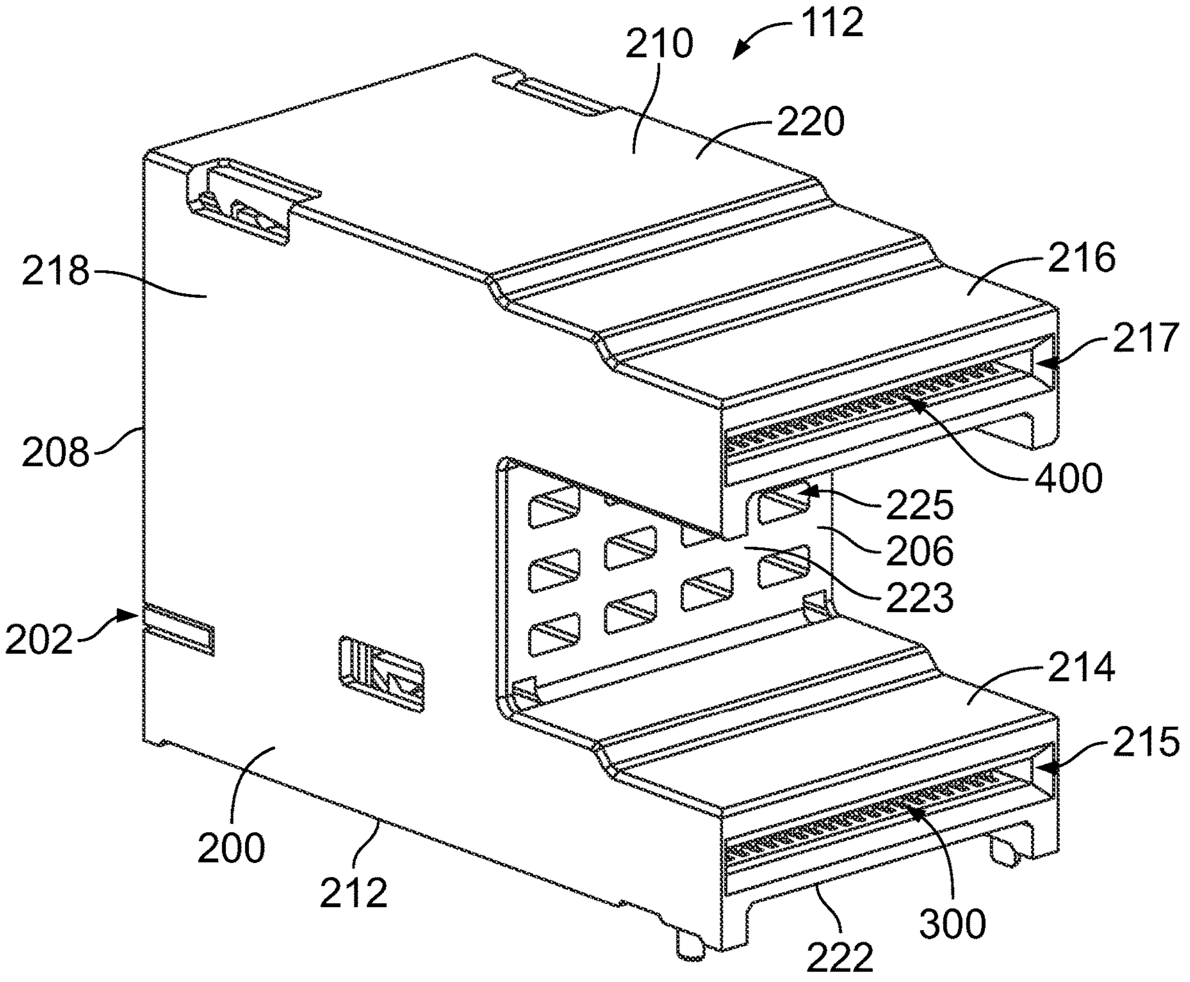
FIG. 3 is a front perspective view of the card edge connector in accordance with an exemplary embodiment.
Figure 4:
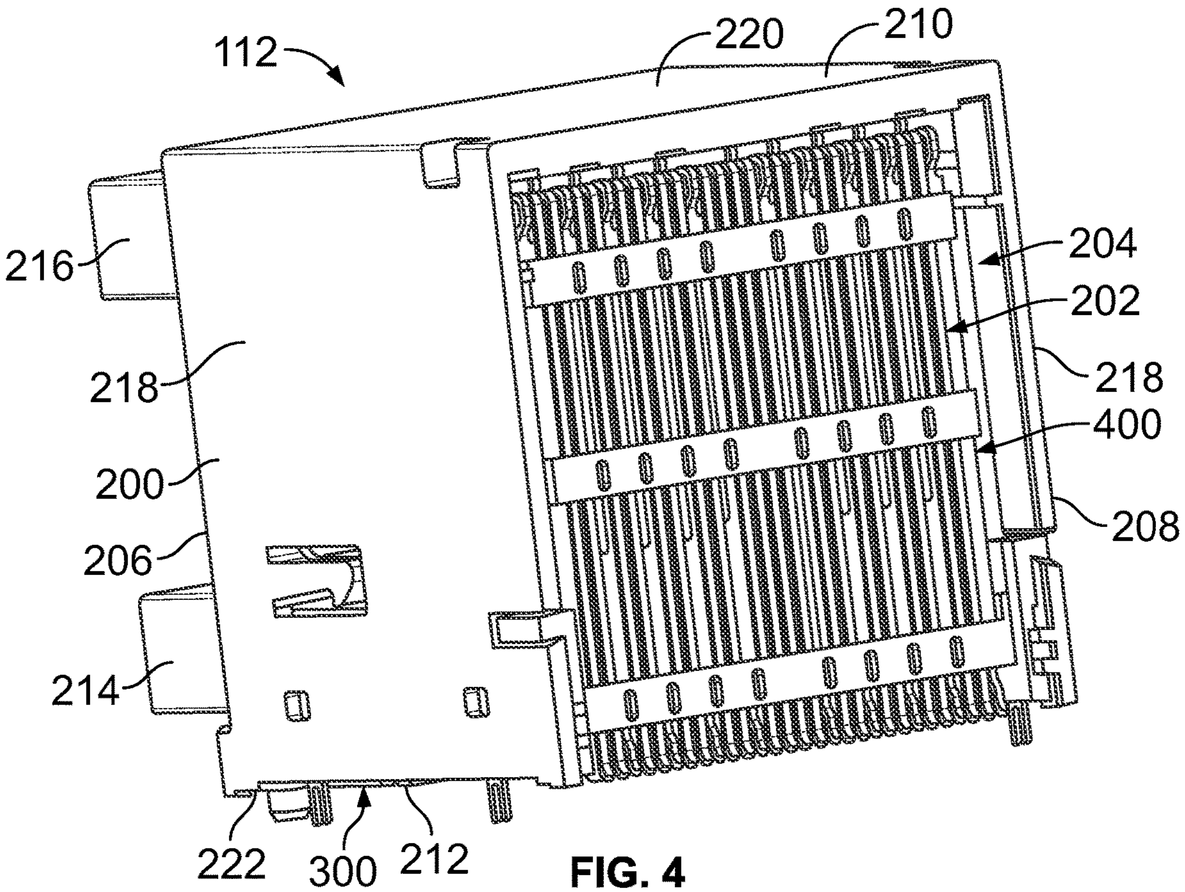
FIG. 4 is a rear perspective view of the card edge connector in accordance with an exemplary embodiment.

FIG. 3 is a front perspective view of the card edge connector 112 in accordance with an exemplary embodiment. FIG. 4 is a rear perspective view of the card edge connector 112 in accordance with an exemplary embodiment. The card edge connector 112 includes a housing 200 having a cavity 204 and a contact assembly 202 received in the cavity 204 of the housing 200.

The housing 200 extends between a front 206 and a rear 208. The cavity 204 is open at the rear 208 to receive the contact assembly 202. The housing 200 extends between a top 210 and a bottom 212. The housing 200 extends between opposite sides 218. The housing 200 may be generally box shaped in various embodiments. In the illustrated embodiment, the bottom 212 defines a mounting end configured to be mounted to the host circuit board 102 (shown in FIG. 1) and the front 206 defines the mating end configured to be mated with the pluggable module 106 (shown in FIG. 1). Other orientations are possible in alternative embodiments.

The housing 200 includes a top wall 220 at the top 210 and a bottom wall 222 at the bottom 212. In the illustrated embodiment, the housing 200 includes an inner shroud 214 and an outer shroud 216 at the front 206 configured to be mated with the pluggable modules 106. The outer shroud 216 is located above the inner shroud 214 closer to the top 210. The inner shroud 214 is located below the outer shroud 216 and is configured to be closer to the host circuit board 102. The shrouds 214, 216 are nosecones configured to be plugged into the mating ends of the pluggable module 106. The inner shroud 214 includes an inner housing card slot 215 and the outer shroud 216 includes an outer housing card slot 217. The housing card slots 215, 217 are open at the front of the shrouds 214, 216. The housing card slots 215, 217 receive the card edges 192 (shown in FIG. 2) of the module circuit boards 190 (shown in FIG. 2).

In an exemplary embodiment, the contact assembly 202 includes an inner contact assembly 300 and an outer contact assembly 400. The inner contact assembly 300 is positioned interior of the outer contact assembly 400. The inner contact assembly 300 is loaded in the cavity 204 and received in the inner shroud 214 for mating with the inner (lower) pluggable module 106. The outer contact assembly 400 is loaded in the cavity 204 and received in the outer shroud 216 for mating with the outer (upper) pluggable module 106.

In an exemplary embodiment, the housing 200 includes a front wall 223 between the inner shroud 214 and the outer shroud 216. The front wall 223 includes openings 225 therethrough. The openings 225 allow airflow through the housing 200, such as for cooling the pluggable modules 106.

Figure 5:
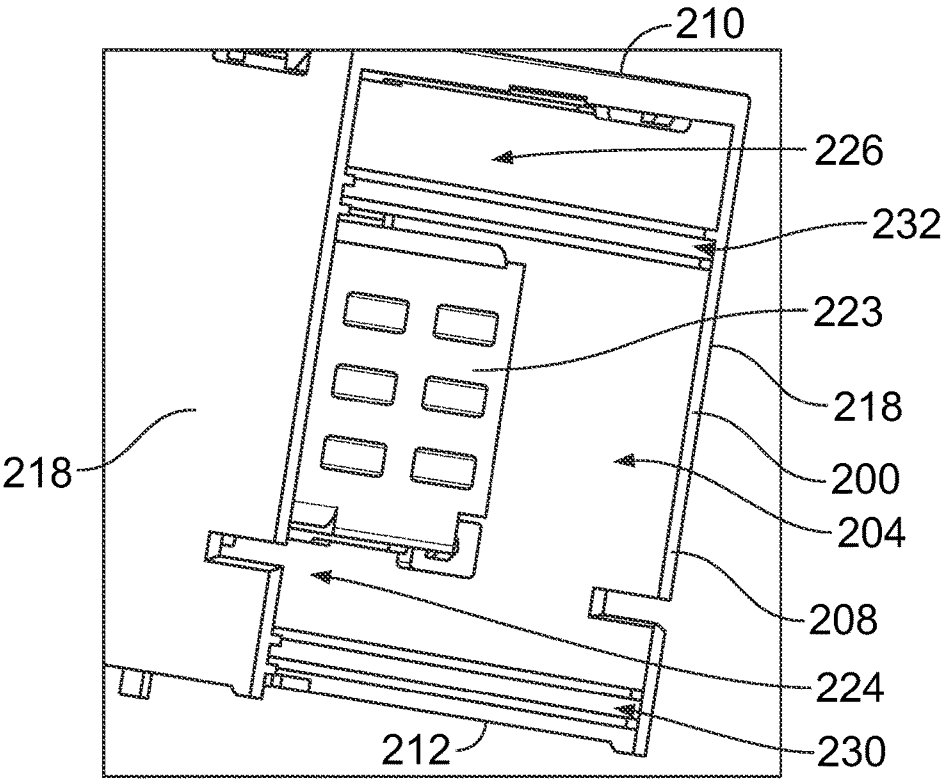
FIG. 5 is a rear view of a portion of the housing in accordance with an exemplary embodiment.

FIG. 5 is a rear view of a portion of the housing 200 in accordance with an exemplary embodiment. FIG. 5 shows the cavity 204, which is open at the rear 208. Such as to receive the contact assembly 202 (shown in FIG. 4). In an exemplary embodiment, the housing 200 includes an inner contact channel 224 at the bottom 212 and an outer contact channel 226 at the top 210. The inner contact channel 224 is located below the outer contact channel 226. The front wall 223 is located between the inner contact channel 224 and the outer contact channel 226. The inner contact channel 224 extends into the inner shroud 214. The outer contact channel 226 extends into the outer shroud 216. The inner contact channel 224 receives the inner contact assembly 300 (FIG. 4). The outer contact channel 226 receives the outer contact assembly 400 (FIG. 4).

In an exemplary embodiment, the housing 200 includes inner housing locating features 230 proximate to the bottom 212 and outer housing locating features 232 proximate to the top 210. The inner housing locating features 230 are used to position the inner contact assembly 300 in the housing 200. The outer housing locating features 232 are used to position the outer contact assembly 400 in the housing 200. The housing locating features 230, 232 are provided along the sides 218 proximate to the bottom 212 and the top 210, respectively. In an exemplary embodiment, the housing locating features 230, 232 may include rails, ribs, tabs, slots, openings, or other types of locating features configured to interface with the contact assemblies 300, 400.

Figure 6:
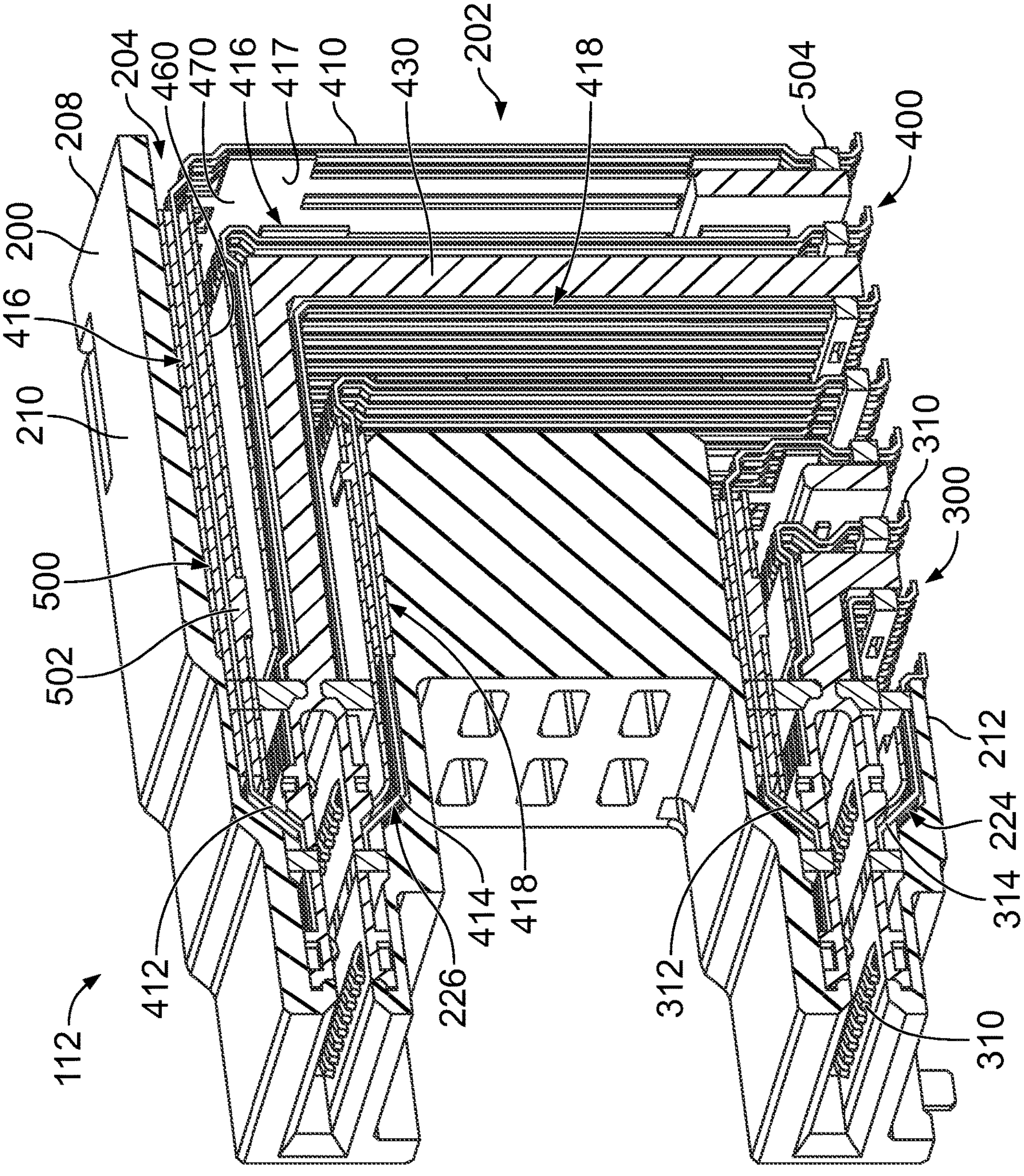
FIG. 6 is a sectional view of the card edge connector in accordance with an exemplary embodiment showing the contact assembly in the housing.

FIG. 6 is a sectional view of the card edge connector 112 in accordance with an exemplary embodiment showing the contact assembly 202 in the housing 200. The contact assembly 202 includes the inner contact assembly 300 and the outer contact assembly 400. The inner contact assembly 300 is positioned interior of the outer contact assembly 400. The inner contact assembly 300 is configured to be coupled to the inner (lower) pluggable module 106 (FIG. 1) and the outer contact assembly 400 is configured to be coupled to the outer (upper) pluggable module 106 (FIG. 1).

In an exemplary embodiment, the inner contact assembly 300 is a double-sided, multi-row contact assembly. For example, the inner contact assembly 300 includes inner contacts 310, which include (inner) upper contacts 312 and (inner) lower contacts 314 arranged on opposite sides of the card slot. The upper contacts 312 are arranged in multiple rows (front row and rear row) and the lower contacts 314 are arranged in multiple rows (front row and rear row). As such, the inner contact assembly 300 has high density and significant data throughput.

In an exemplary embodiment, the outer contact assembly 400 is a double-sided, multi-row contact assembly. For example, the outer contact assembly 400 includes outer contacts 410, which include (outer) upper contacts 412 and (outer) lower contacts 414 arranged on opposite sides of the card slot. The upper contacts 412 are arranged in at least one upper contact array 416. The lower contacts 414 are arranged in at least one lower contact array 418. The upper contacts 412 may be arranged in a single row or may be arranged in multiple rows (front row and rear row) to increase the density. The lower contacts 414 may be arranged in a single row or may be arranged in multiple rows (front row and rear row) to increase the density. For example, a pair of the upper contact arrays 416 may be coupled together to arrange the upper contacts 412 in two rows and a pair of the lower contact arrays 418 may be coupled together to arrange the lower contacts 414 in two rows.

The contact assemblies 300, 400 are positioned in the cavity 204 of the housing 200. For example, the contact assemblies 300, 400 are loaded through the rear 208 into the cavity 204. The inner contact assembly 300 is loaded into the inner contact channel 224 at the bottom 212. The outer contact assembly 400 is loaded into the outer contact channel 226 at the top 210.

Figure 7:
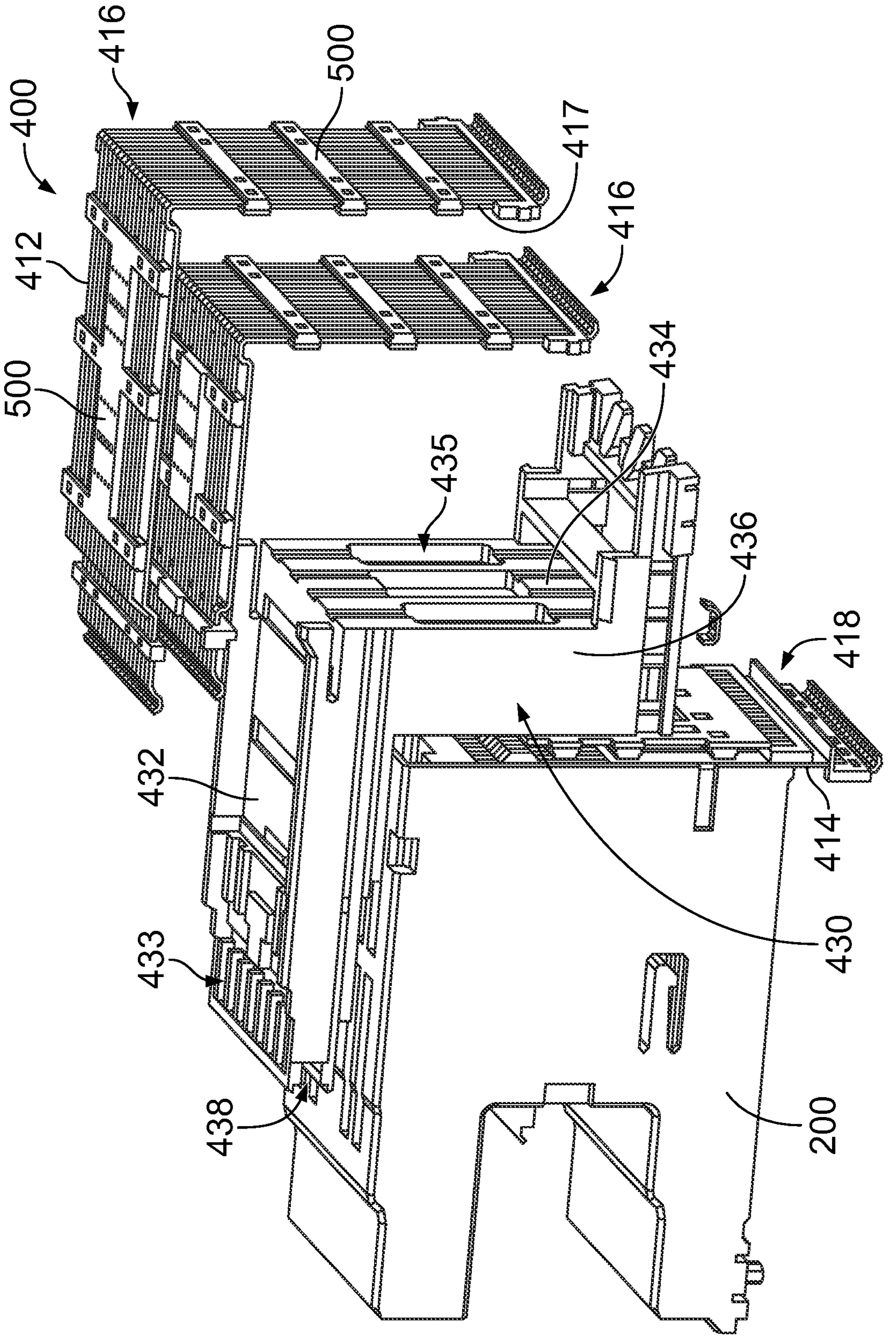
FIG. 7 is an exploded view of the outer contact assembly in accordance with an exemplary embodiment.

FIG. 7 is an exploded view of the outer contact assembly 400 in accordance with an exemplary embodiment. The inner contact assembly 300 may include similar components as the outer contact assembly 400, which may be sized and shaped differently for loading into the housing 200. The outer contact assembly 400 includes an outer contact positioner 430 supporting the upper contact array(s) 416 and the lower contact array(s) 418.

The outer contact positioner 430 is used to position the upper and lower contacts 412, 414 relative to each other. The outer contact positioner 430 is used to hold the contact arrays 416, 418 for loading the outer contact assembly 400 into the housing 200 (shown in FIG. 4). In an exemplary embodiment, the contacts 412, 414 are movable relative to the outer contact positioner 430 for proper alignment and positioning for mating with the pluggable module 106 and mounting to the host circuit board 102.

The outer contact positioner 430 includes a central wall 432, a rear wall 434, and side walls 436 along the sides of the central wall 432 and the rear wall 434. The central wall 432 extends forward from the rear wall 434 to a front of the outer contact positioner 430. The central wall 432 may be oriented generally perpendicular to the rear wall 434. The central wall 432 may be oriented horizontally. The rear wall 434 may be oriented vertically. The central wall 432 may include openings 433, such as to receive the upper contacts 412 and/or the lower contacts 414, such as to position the upper and lower contacts 412, 414 for mating with the module circuit board 190. The rear wall 434 may include openings 435, such as for airflow through the rear wall 434. The outer contact positioner 430 has an outer positioner card slot 438 in the central wall 432 at the front. The outer positioner card slot 438 is configured to receive the card edge 192 of the module circuit board 190 (shown in FIG. 2). The upper and lower contact arrays 416, 418 are located between the side walls 436. The central wall 432 and the rear wall 434 hold the upper and lower contact arrays 416, 418. For example, the upper contact array 416 is located above the central wall 432 and rearward of the rear wall 434. The lower contact array 418 is located below the central wall 432 and forward of the rear wall 434.

In the illustrated embodiment, the outer contact assembly 400 includes a pair of the upper contact arrays 416 configured to be coupled together to provide the upper contacts 412 in two rows and increase the density of the outer contact assembly 400 compared to an example having a single upper contact array 416.

In an exemplary embodiment, the upper contact array 416 includes the upper contacts 412 and an upper shield structure 417 providing electrical shielding for the upper contacts 412. In an exemplary embodiment, the upper contact array 416 includes a signal leadframe forming the upper contacts 412. The signal leadframe is a stamped and formed leadframe to form the upper contacts 412. The signal leadframe may be overmolded with one or more overmolded bodies to hold the relative positions of the upper contacts 412. For example, the upper contact array 416 includes one or more upper contact holders 500 holding the upper contacts 412. The upper contact holders 500 may be overmolded bodies overmolded over the upper contacts 412. The upper contact holders 500 may extend side-to-side across the width of the upper contact array 416 to hold each of the upper contacts 412. The upper contact holders 500 may be coupled to the outer contact positioner 430 to position the upper contact array 416 relative to the outer contact positioner 430. The mating ends of the upper contacts 412 are arranged in a row; however, the upper contacts may be arranged in multiple rows. The mounting ends of the upper contacts 412 may be arranged in a row; however, the mounting ends may be arranged in multiple rows.

Figure 8:
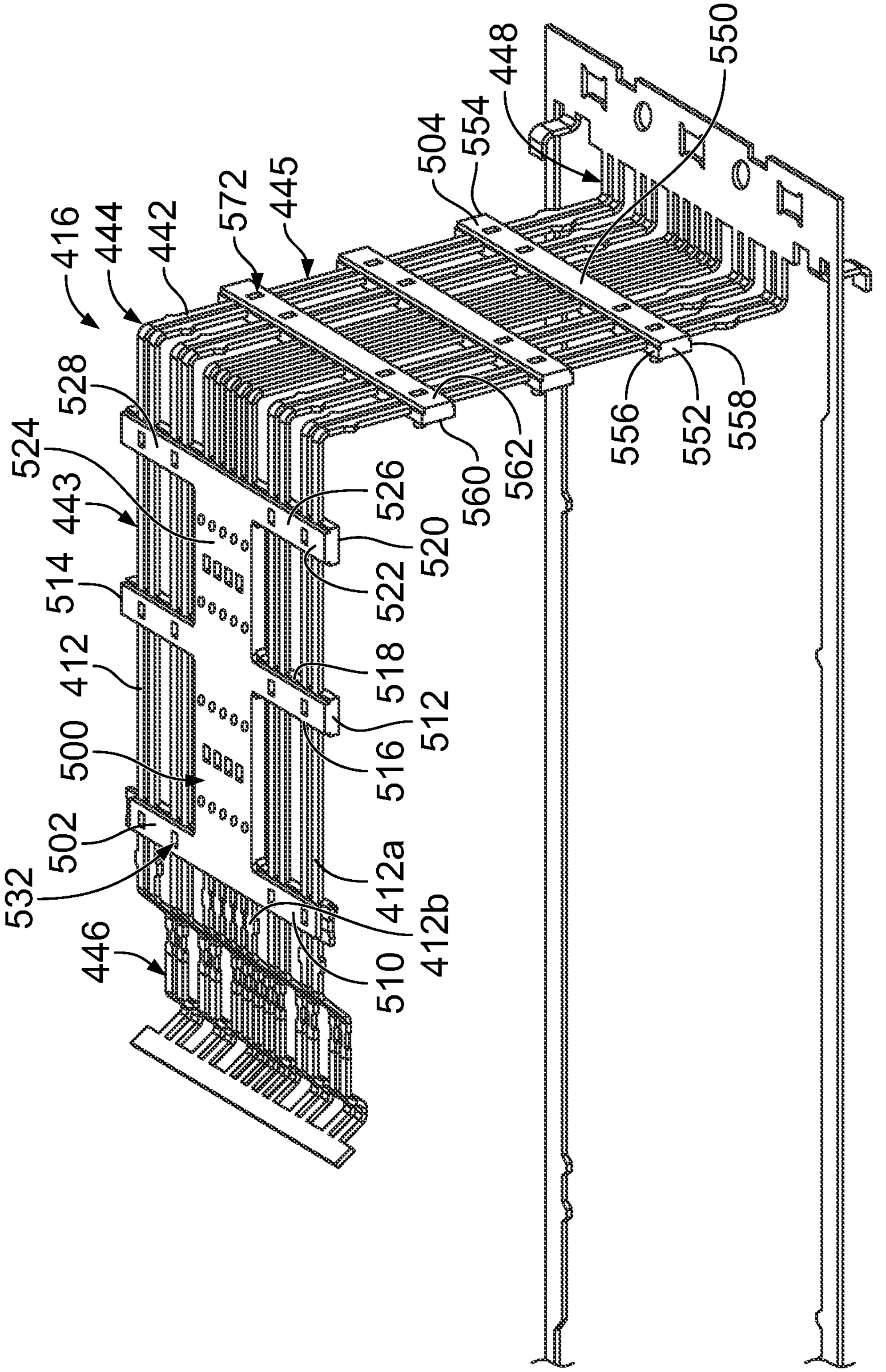
FIG. 8 is a rear perspective view of a leadframe of the upper contact array in accordance with an exemplary embodiment.
Figure 9:
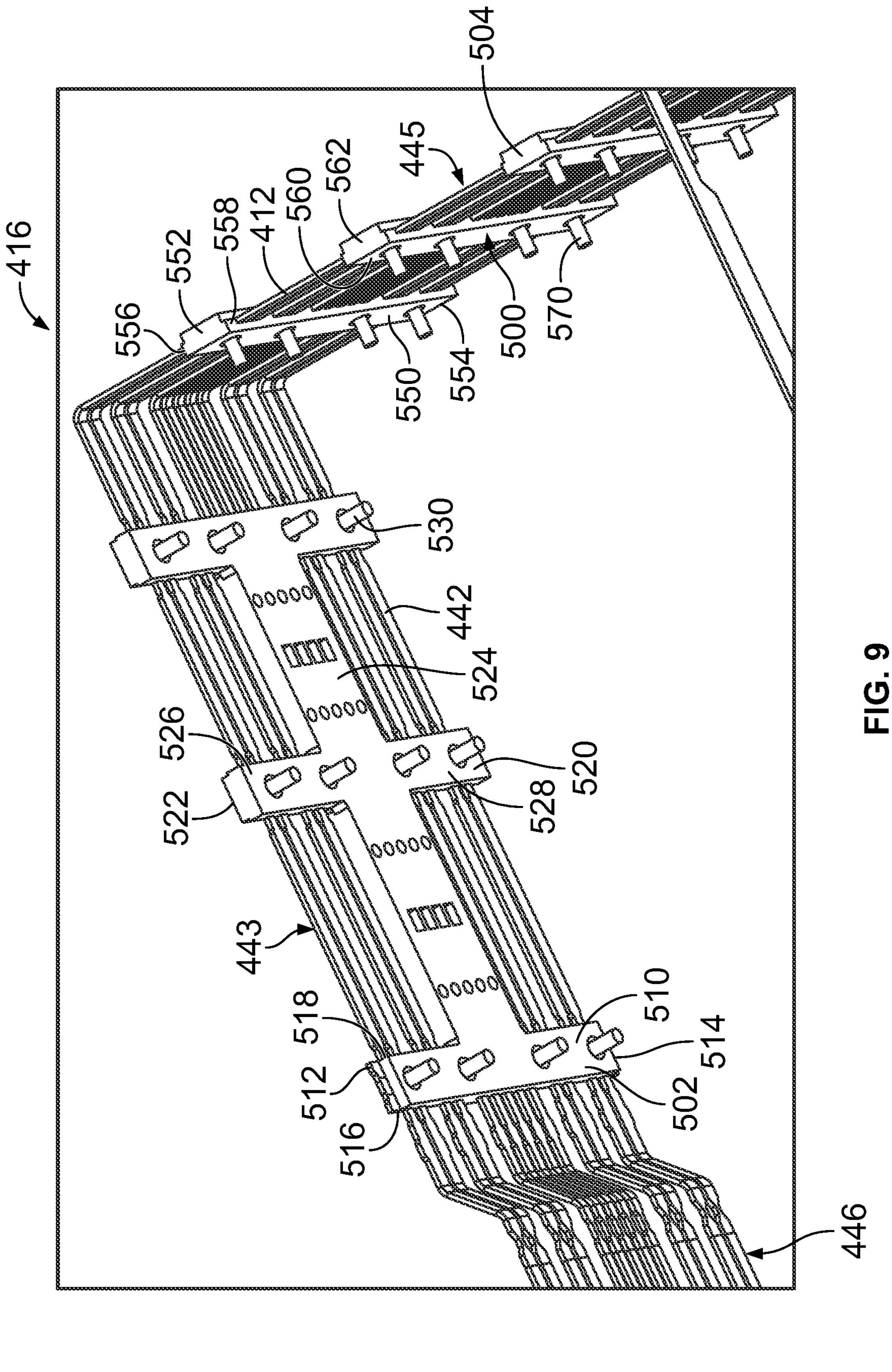
FIG. 9 is a bottom perspective view of the leadframe of the upper contact array in accordance with an exemplary embodiment.

FIG. 8 is a rear perspective view of a leadframe of the upper contact array 416 in accordance with an exemplary embodiment. FIG. 9 is a bottom perspective view of the leadframe of the upper contact array 416 in accordance with an exemplary embodiment. The upper contacts 412 are shown held by the upper contact holders 500. The upper contacts 412 are shown held by a carrier of the leadframe. The carrier is later removed during a stamping or cutting process to separate the upper contacts 412 from each other and from the carrier. For example, the carrier may be removed after the upper contact holders 500 are overmolded over the leadframe.

In an exemplary embodiment, each upper contact 412 includes a transition portion 442 extending between a mating beam 446 at a mating end and a contact tail 448 at a terminating end. In an exemplary embodiment, the upper contacts 412 are right angle contacts having the mating beams 446 oriented generally perpendicular to the contact tails 448. The transition portion 442 includes one or more bends 444, such as 90° bends. The transition portion 442 of each upper contact 412 includes a forward section 443 and a rearward section 445. The bend 444 is located between the forward section 443 and the rearward section 445.

In an exemplary embodiment, the upper contact holders 500 include one or more upper forward contact holders 502 coupled to the forward sections 443 to support the forward sections 443 and one or more upper rearward contact holders 504 are coupled to the rearward sections 445 to support the rearward sections 445. The mating beams 446 extend from the forward sections 443 for mating with the module circuit board 190. When the carrier is removed, the mating beams 446 are independently movable relative to each other. The contact tails 448 extend from the rearward sections 445 for mating with the host circuit board 102. For example, the contact tails 448 may be solder tails configured to be soldered to the host circuit board 102.

Each forward contact holder 502 includes a dielectric body 510 extending between a first side 512 and a second side 514 of the forward contact holder 502. The forward contact holder 502 includes opposite ends 516, 518. The forward contact holder 502 includes an inner surface 520 and an outer surface 522. In an exemplary embodiment, the forward contact holder 502 is overmolded over the upper contacts 412. The forward contact holder 502 holds relative positions of the upper contacts 412. In the illustrated embodiment, the upper contact array 416 includes three of the forward contact holders 502; however, the upper contact array 416 may include greater or fewer forward contact holders 502 in alternative embodiments. In an exemplary embodiment, the forward contact holders 502 are connected by a backbone or central body 524. Each forward contact holder 502 forms a first arm 526 extending from the central body 524 to the first side 512 and a second arm 528 extending from the central body 524 to the second side 514. The upper contact array 416 may be provided without the central body 524.

The forward contact holders 502 include mounting posts 530 extending from the inner surface 520. The mounting posts 530 are used to mount the forward contact holders 502 to the upper shielding structure. In various embodiments, the mounting posts 530 may be heat staked, cold staked, friction-coupled, glued or otherwise secured to the upper shielding structure. In an exemplary embodiment, the forward contact holders 502 include air core openings 532 aligned with each of the mounting posts 530. The air core openings 532 are exposed to the upper contacts 412. The air core openings 532 are sized and shaped for impedance control, such as to achieve a target impedance along the upper contacts 412 as the upper contacts 412 traverse through the forward contact holders 502.

Each rearward contact holder 504 includes a dielectric body 550 extending between a first side 552 and a second side 554 of the rearward contact holder 504. The rearward contact holder 504 includes opposite ends 556, 558. The rearward contact holder 504 includes an inner surface 560 and an outer surface 562. In an exemplary embodiment, the rearward contact holder 504 is overmolded over the upper contacts 412. The rearward contact holder 504 holds relative positions of the upper contacts 412. In the illustrated embodiment, the upper contact array 416 includes three of the rearward contact holders 504; however, the upper contact array 416 may include greater or fewer rearward contact holders 504 in alternative embodiments. The rearward contact holders 504 are spaced apart from each other.

The rearward contact holders 504 include mounting posts 570 extending from the inner surface 520. The mounting posts 570 are used to mount the rearward contact holders 504 to the upper shielding structure. In various embodiments, the mounting posts 570 may be heat staked, cold staked, friction-coupled, glued or otherwise secured to the upper shielding structure. In an exemplary embodiment, the rearward contact holders 504 include air core openings 572 aligned with each of the mounting posts 570. The air core openings 572 are exposed to the upper contacts 412. The air core openings 572 are sized and shaped for impedance control, such as to achieve a target impedance along the upper contacts 412 as the upper contacts 412 traverse through the rearward contact holders 504.

In an exemplary embodiment, the upper contacts 412 are signal contacts. In an exemplary embodiment, the upper contacts 412 include high-speed signal contacts 412*a* and low-speed signal contacts 412*b*. In various embodiments, the high-speed signal contacts may be arranged in pairs, such as configured to convey differential signals. For example, in the illustrated embodiment, the two pairs of the high-speed signal contacts 412*a* are arranged on both sides of a group of the low-speed signal contacts 412*b*. Larger gaps may be provided between the pairs of the high-speed signal contacts 412*a*. Other arrangements are possible in alternative embodiments. In various embodiments, some of the upper contacts 412 may be ground contacts interspersed between signal contacts or pairs of signal contacts.

In the illustrated embodiment, the central body 524 is overmolded over the low-speed signal contacts 412*b* and the arms 526, 528 are overmolded over the high-speed signal contacts 412*a*. Other arrangements are possible in alternative embodiments.

In an exemplary embodiment, the upper contacts 412 are flexible and configured to be elastically deformed and flexed, such as during assembly and during mating with the module circuit board 190. The mating beams 446 may be cantilevered spring beams configured to be flexed when mated with the module circuit board 190. The contact tails 448 may be flexed when mounted to the host circuit board 102.

Figure 10:
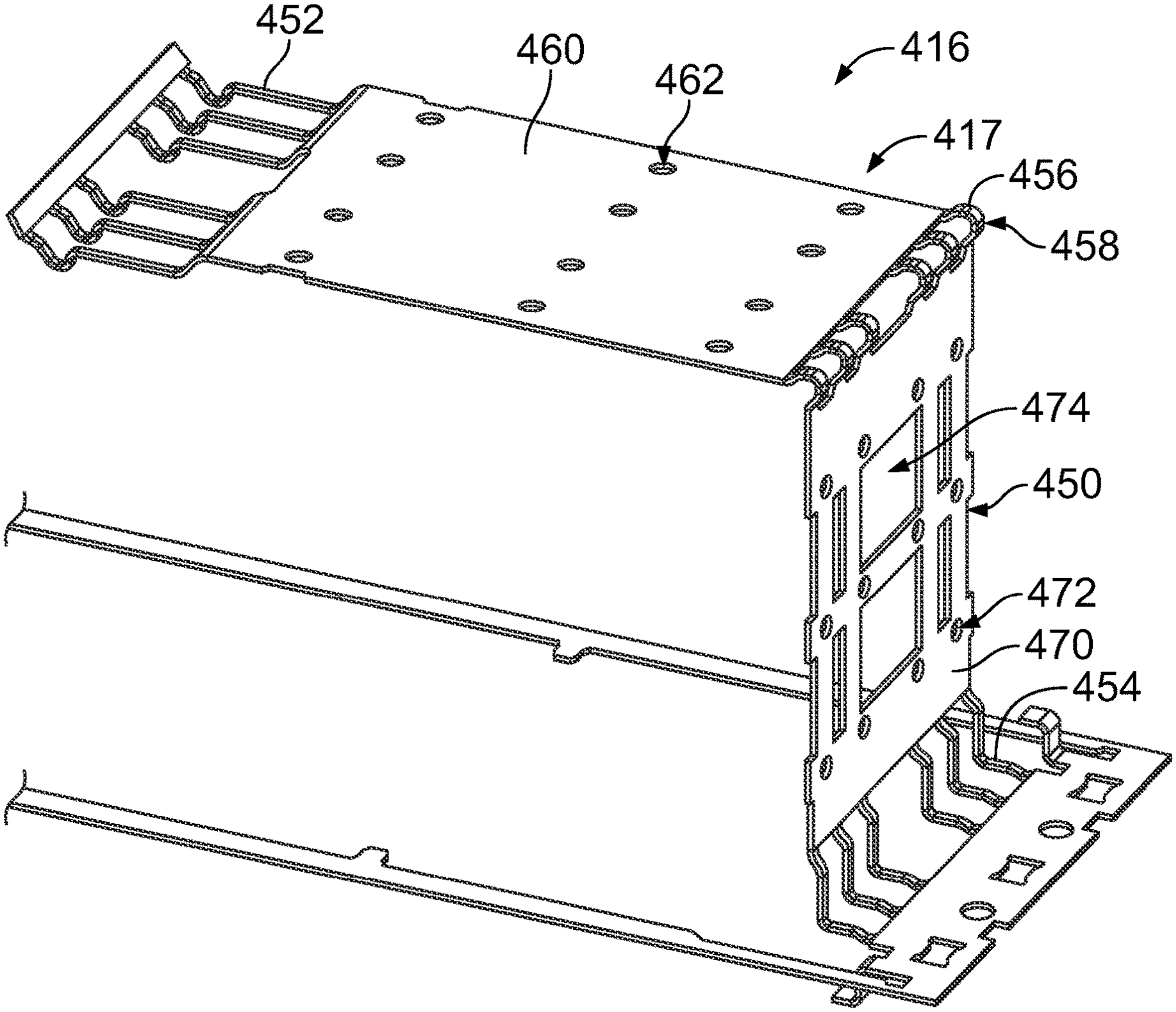
FIG. 10 is a rear perspective view of the upper shield structure of the upper contact array in accordance with an exemplary embodiment.

FIG. 10 is a rear perspective view of the upper shield structure 417 of the upper contact array 416 in accordance with an exemplary embodiment. In an exemplary embodiment, the upper shield structure 417 includes an upper ground shield 450 having ground beams 452 at a mating end, ground tails 454 at a terminating end, and connecting beams 456 having bends 458 between an upper ground plate 460 and an upper ground panel 470. The upper shield structure 417 may be stamped and formed from a metal sheet. A carrier is stamped with the upper shield structure 417, which is later removed by a stamping or cutting process, such as after assembly with the leadframe and the contact holders.

The upper ground plate 460 is planar and extending along a top of the upper ground shield 450. The upper ground panel 470 is planar and extending along a rear of the upper ground shield 450. The upper ground plate 460 and the upper ground panel 470 are oriented perpendicular to each other. The ground beams 452 extend forward from the upper ground plate 460. The ground tails 454 extend from the bottom edge of the upper ground panel 470. In an exemplary embodiment, the upper ground plate 460 includes openings 462 configured to receive the mounting posts 530 (shown in FIG. 9). The upper ground panel 470 includes openings 472 configured to receive the mounting posts 570 (shown in FIG. 9). The upper ground panel 470 may include airflow openings 474 therethrough to allow cooling airflow through the upper shield structure 417.

Figure 11:
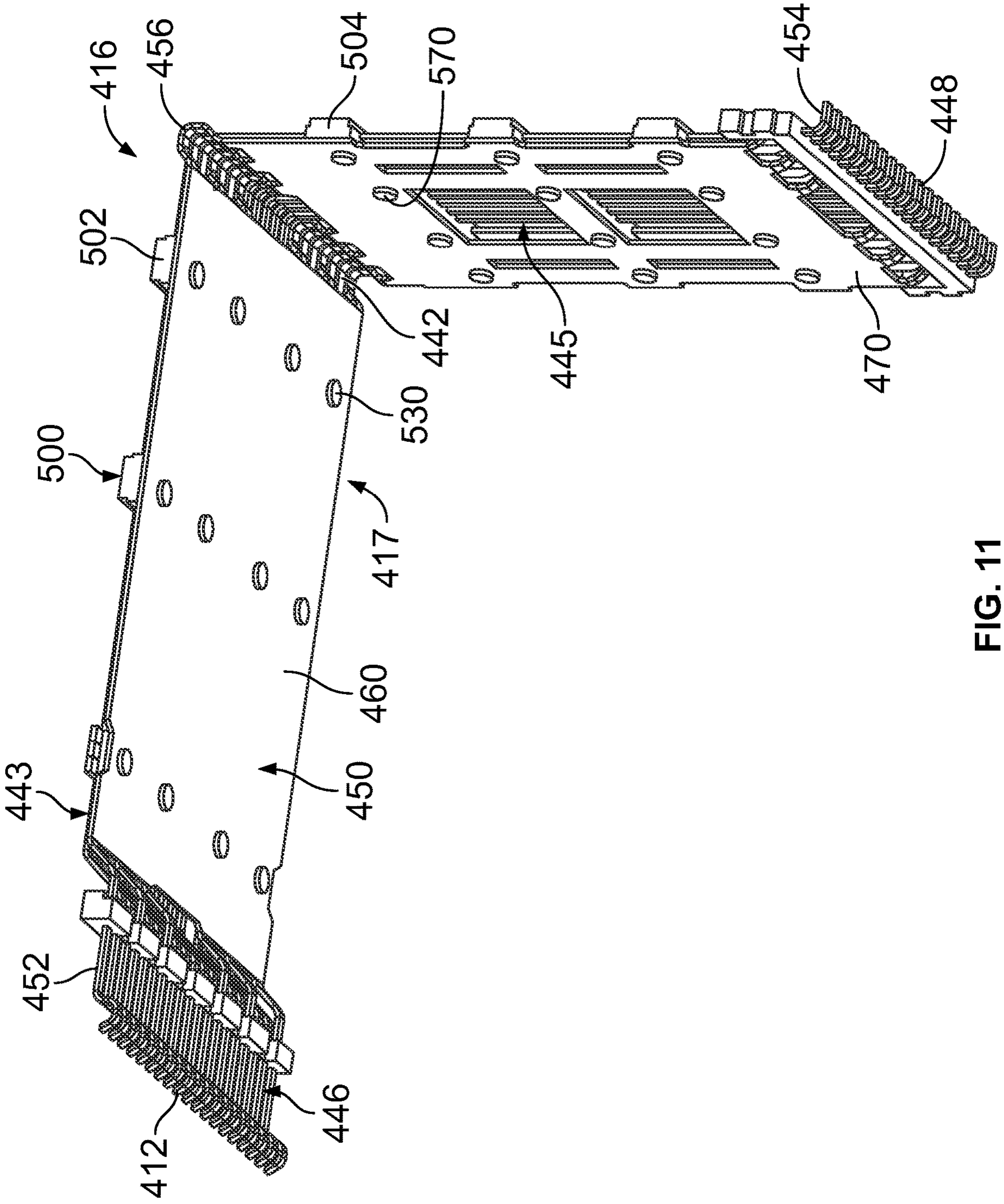
FIG. 11 is a bottom perspective view of the upper contact array in accordance with an exemplary embodiment showing the leadframe and the upper contact holders coupled to the upper ground shield.
Figure 12:
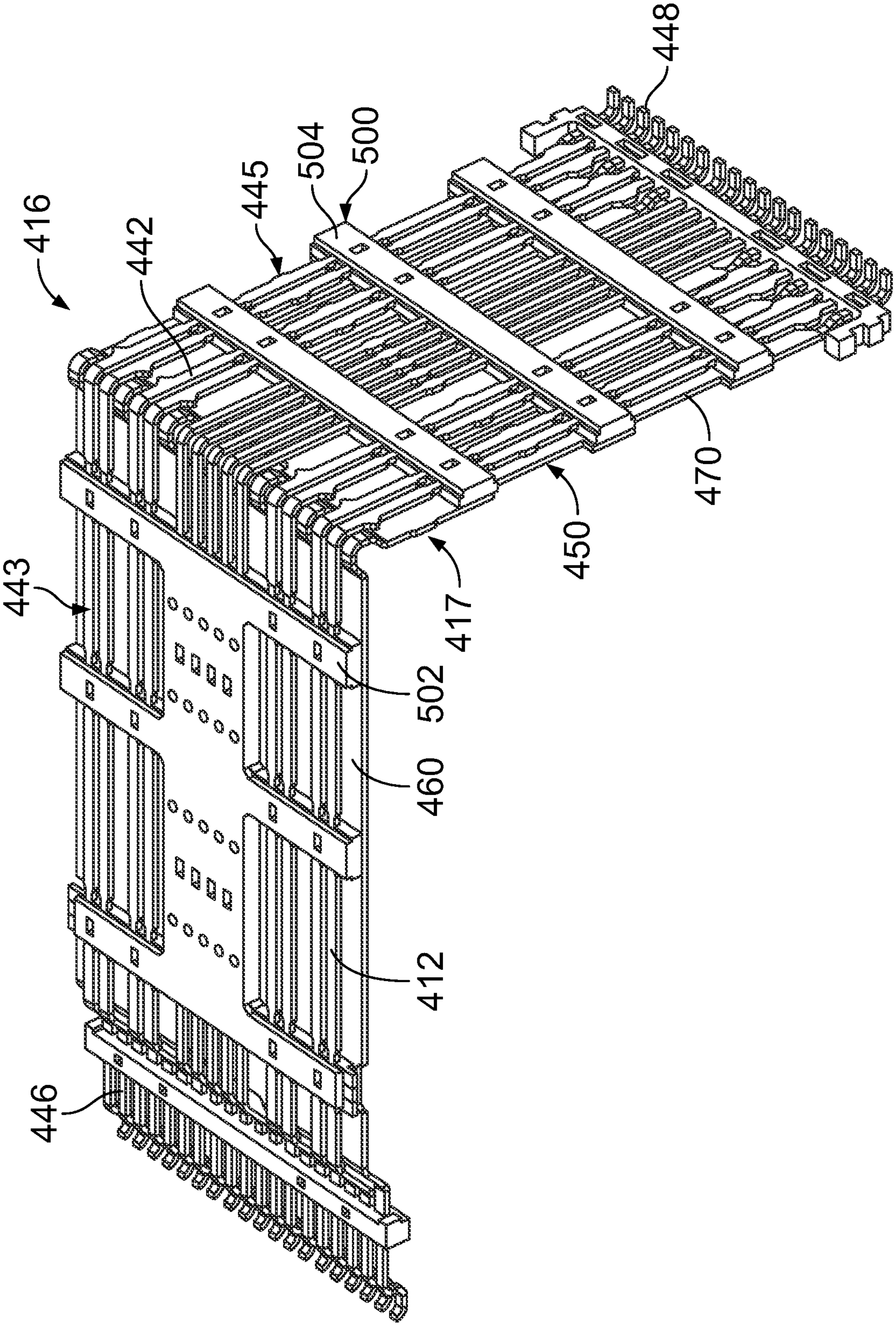
FIG. 12 is a top perspective view of the upper contact array in accordance with an exemplary embodiment showing the leadframe and the upper contact holders coupled to the upper ground shield.

FIG. 11 is a bottom perspective view of the upper contact array 416 in accordance with an exemplary embodiment showing the leadframe and the upper contact holders 500 coupled to the upper ground shield 450. FIG. 12 is a top perspective view of the upper contact array 416 in accordance with an exemplary embodiment showing the leadframe and the upper contact holders 500 coupled to the upper ground shield 450.

The upper ground shield 450 provides shielding for the upper contacts 412. The upper ground plate 460 supports and shields the forward sections 443 of the upper contacts 412. The mounting posts 530 are received in the openings 462 of the upper ground plate 460 to secure the forward contact holders 502 to the upper ground plate 460. The forward sections 443 extend parallel to and closely spaced apart from the upper ground plate 460. The forward contact holders 502 position the forward sections 443 of the upper contacts 412 relative to the upper ground plate 460. The upper ground panel 470 supports and shields the rearward sections 445 of the upper contacts 412. The mounting posts 570 are received in the openings 472 of the upper ground panel 470 to secure the rearward contact holders 504 to the upper ground panel 470. The rearward sections 445 extend parallel to and closely spaced apart from the upper ground panel 470. The rearward contact holders 504 position the rearward sections 445 of the upper contacts 412 relative to the upper ground panel 470.

In an exemplary embodiment, the upper ground plate 460 and the upper ground panel 470 span the entire width of the upper contact array 416 to cover all of the upper contacts 412. The upper ground plate 460 and the upper ground panel 470 may cover a majority of the lengths of the forward sections 443 and rearward sections 445 of the upper contacts 412.

The upper ground shield 450 includes the ground beams 452 extending from the front edge of the upper ground plate 460. The ground beams 452 are located between the mating beams 446, such as between pairs of the mating beams 446. The ground beams 452 are deflectable beams configured to be mated with the module circuit board 190. The upper ground shield 450 includes the ground tails 454 extending from the bottom edge of the upper ground panel 470. The ground tails 454 are located between the contact tails 448, such as between pairs of the contact tails 448. The ground tails 454 may be solder tails, compliant tails, or other components that may be terminated to the host circuit board 102.

The upper shield structure 417 provides electrical shielding for the upper contacts 412. The upper shield structure 417 extends along the transition portions 442. The upper ground plate 460 and the upper ground panel 470 define a primary ground for the signals. The upper shield structure 417 provides shielding between the pairs of the upper contacts 412, such as using the ground beams 452, the ground tails 454 and the connecting beams 456. The upper ground shield 450 reduces crosstalk between the upper contacts 412. The forward and rearward sections 443, 445 of the upper contacts 412 are closely coupled to the upper ground plate 460 and the upper ground panel 470, respectively, to reduce broadband in-row cross talk between the upper contacts 412. The upper ground plate 460 and the upper ground panel 470 improve electrical performance, allowing operation at high data rates.

Returning to FIG. 6, the lower contact array 418 may be similar to the upper contact array 416 and include similar components, which may be sized and shaped differently to fit within the outer contact positioner 430. The components of the lower contact array 418 may be identified with like reference numerals and may be identified herein using “lower” rather than “upper”. In an exemplary embodiment, the inner contact assembly 300 includes upper and lower contact arrays similar to the upper and lower contact arrays 416, 418 of the outer contact assembly 400. The inner upper and lower contact arrays include similar components, which may be sized and shaped differently to fit within the inner contact channel 224 and inner shroud 214.

The lower contact array 418 includes the lower contacts 414 and a lower shield structure 417 providing electrical shielding for the lower contacts 414. In an exemplary embodiment, the lower contact array 418 includes a signal leadframe forming the lower contacts 414. The lower contact array 418 includes one or more lower contact holders 500 holding the lower contacts 414, such as the forward contact holders 502 and the rearward contact holders 502. The lower contact holders 500 are overmolded bodies overmolded over the lower contacts 414. The lower contact holders 500 extend side-to-side across the width of the lower contact array 418 to hold each of the lower contacts 414. The lower shield structure 417 includes the lower ground plate 460 and the lower ground panel 470 supporting and shielding the lower contacts 414.

Figure 13:
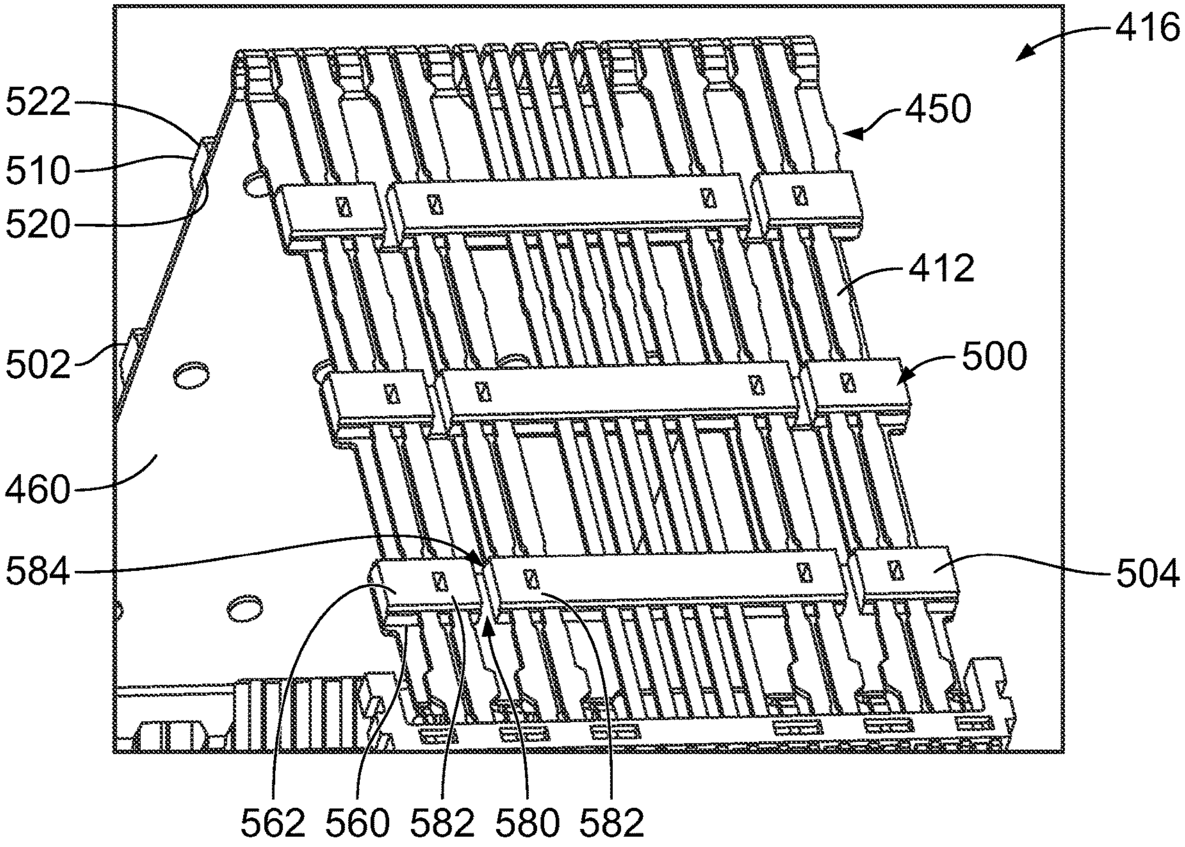
FIG. 13 is a rear perspective view of a portion of the upper contact array in accordance with an exemplary embodiment showing the leadframe and the upper contact holders coupled to the upper ground shield.
Figure 14:
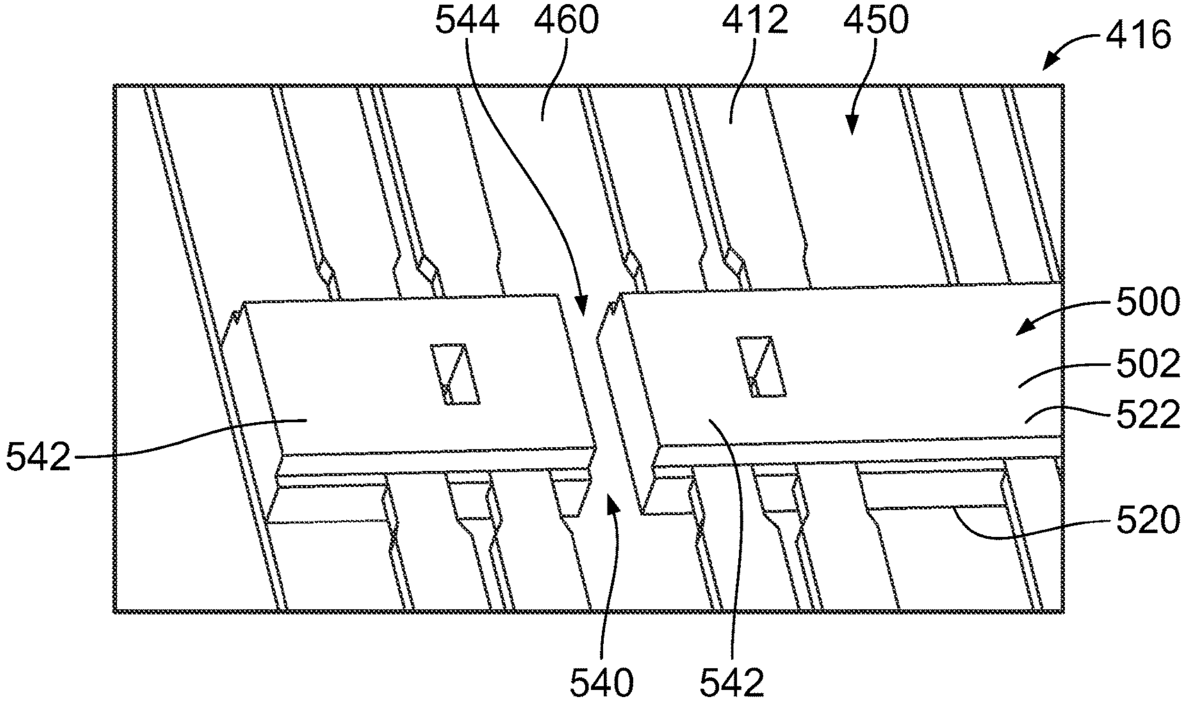
FIG. 14 is a top perspective view of a portion of the upper contact array in accordance with an exemplary embodiment showing the leadframe and the upper contact holders coupled to the upper ground shield.

FIG. 13 is a rear perspective view of a portion of the upper contact array 416 in accordance with an exemplary embodiment showing the leadframe and the upper contact holders 500 coupled to the upper ground shield 450. FIG. 14 is a top perspective view of a portion of the upper contact array 416 in accordance with an exemplary embodiment showing the leadframe and the upper contact holders 500 coupled to the upper ground shield 450.

In an exemplary embodiment, the upper contact holders 500 include slots that separate the upper contact holders 500 into discrete sections. The slots introduce air between the corresponding upper contacts 412, such as between the pairs of the upper contacts 412. The slots form discontinuities between the pairs of the upper contacts 412 to reduce crosstalk between the pairs of the upper contacts 412. The slots provide isolation between the pairs to reduce pair-to-pair cross talk. The slot eliminates a resonance path in the plastic of the upper contact holder and allows improved coupled to the ground path defined by the upper ground shield 450.

Each upper forward contact holder 502 includes at least one forward slot 540 in the dielectric body 510. The forward slot 540 may be formed by cutting or removing material of the upper forward contact holder 502 to from the forward slot 540. In other embodiments, the forward slot 540 may be formed during the molding process. The forward slot 540 divides the upper forward contact holder 502 into discrete sections 542. The forward slot 540 forms an air trench 544 between the discrete sections 542.

In various embodiments, the forward slot 540 extends entirely through the upper forward contact holder 502 to complete separate the discrete sections 542. For example, the forward slot 540 is open at the inner surface 520 and the outer surface 522. However, in other embodiments, the forward slot 540 may extend only partially through the upper forward contact holder 502 to partially separate the discrete sections 542 from each other. For example, the forward slot 540 may be open at the inner surface 520 or at the outer surface 522. The forward slot 540 is deep enough such that the air trench 544 is aligned in plane with the upper contacts 412. The air trench 544 of the forward slot 540 may be open to the upper ground plate 460 to improve coupling to the ground path defined by the upper ground plate 460.

The forward slot 540 introduces air between the corresponding upper contacts 412, such as between the pairs of the upper contacts 412. The forward slot 540 forms discontinuities between the pairs of the upper contacts 412 to reduce crosstalk between the pairs of the upper contacts 412. The forward slot 540 provide isolation between the pairs to reduce pair-to-pair cross talk. The forward slot 540 eliminates a resonance path in the plastic of the upper forward contact holder 502 and allows improved coupled to the ground path defined by the upper ground shield 450.

Each upper rearward contact holder 504 includes at least one rearward slot 580 in the dielectric body 510. The rearward slot 580 may be formed by cutting or removing material of the upper rearward contact holder 504 to from the rearward slot 580. In other embodiments, the rearward slot 580 may be formed during the molding process. The rearward slot 580 divides the upper rearward contact holder 504 into discrete sections 582. The rearward slot 580 forms an air trench 584 between the discrete sections 582.

In various embodiments, the rearward slot 580 extends entirely through the upper rearward contact holder 504 to complete separate the discrete sections 582. For example, the rearward slot 580 is open at the inner surface 560 and the outer surface 562. However, in other embodiments, the rearward slot 580 may extend only partially through the upper rearward contact holder 504 to partially separate the discrete sections 582 from each other. For example, the rearward slot 580 may be open at the inner surface 560 or at the outer surface 562. The rearward slot 580 is deep enough such that the air trench 584 is aligned in plane with the upper contacts 412. The air trench 584 of the rearward slot 580 may be open to the upper ground plate 460 to improve coupling to the ground path defined by the upper ground plate 460.

The rearward slot 580 introduces air between the corresponding upper contacts 412, such as between the pairs of the upper contacts 412. The rearward slot 580 forms discontinuities between the pairs of the upper contacts 412 to reduce crosstalk between the pairs of the upper contacts 412. The rearward slot 580 provide isolation between the pairs to reduce pair-to-pair cross talk. The rearward slot 580 eliminates a resonance path in the plastic of the upper rearward contact holder 504 and allows improved coupled to the ground path defined by the upper ground shield 450.

Figure 15:
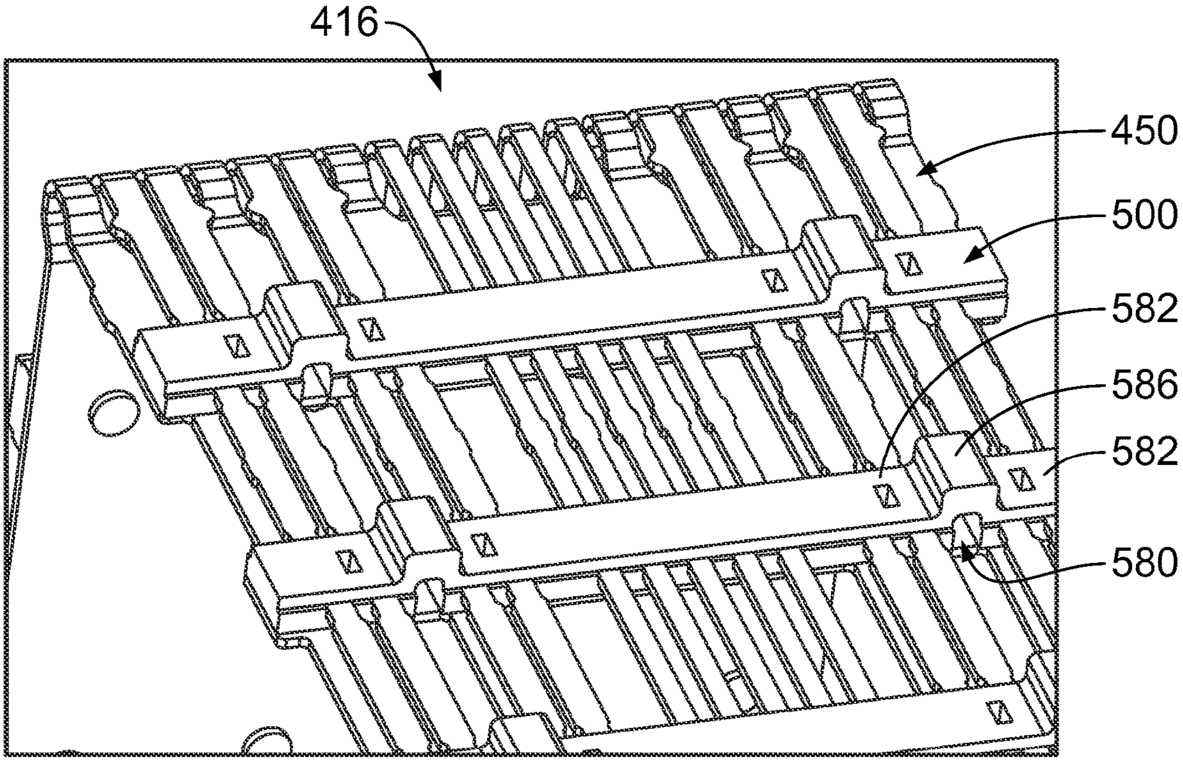
FIG. 15 is a top perspective view of a portion of the upper contact array in accordance with an exemplary embodiment showing the leadframe and the upper contact holders coupled to the upper ground shield.
Figure 16:
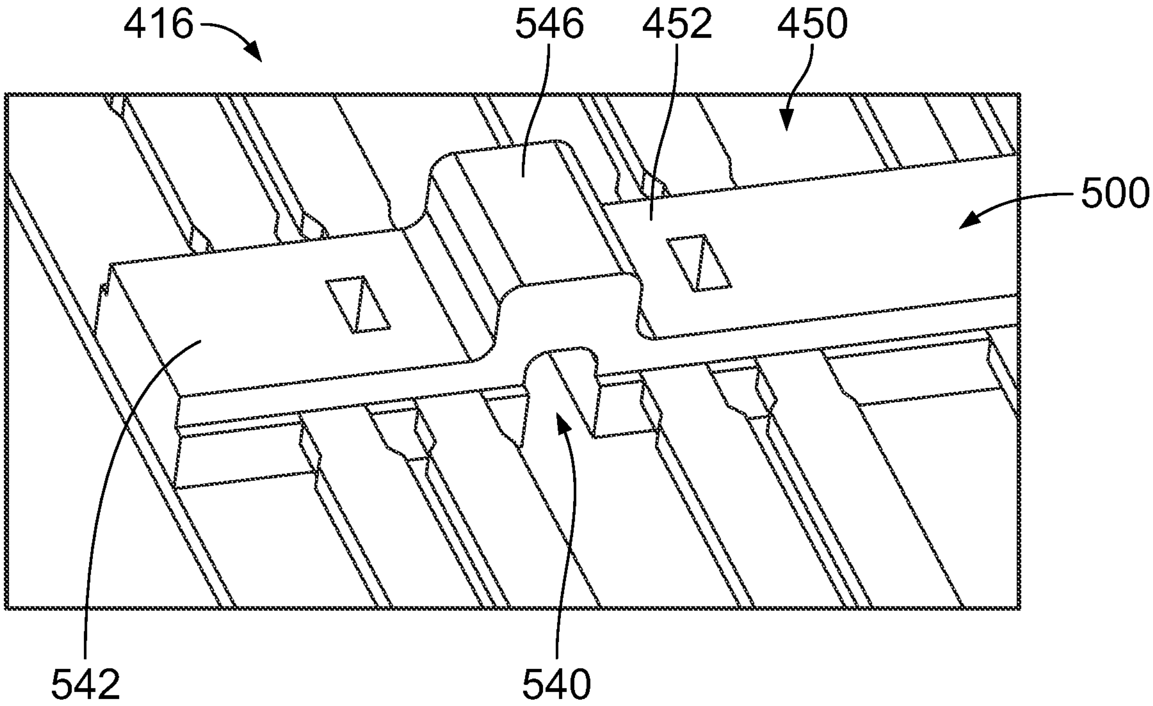
FIG. 16 is a rear perspective view of a portion of the upper contact array in accordance with an exemplary embodiment showing the leadframe and the upper contact holders coupled to the upper ground shield.

FIG. 15 is a rear perspective view of a portion of the upper contact array 416 in accordance with an exemplary embodiment showing the leadframe and the upper contact holders 500 coupled to the upper ground shield 450. FIG. 16 is a top perspective view of a portion of the upper contact array 416 in accordance with an exemplary embodiment showing the leadframe and the upper contact holders 500 coupled to the upper ground shield 450. FIGS. 15 and 16 illustrate connecting portions 546, 586 between the discrete sections 542, 582. The connecting portions 546, 586 are aligned with the forward slots 540 and the rearward slots 580, respectively. The connecting portions 546, 586 cover the forward slots 540 and the rearward slots 580, respectively. The connecting portions 546, 586 may be co-molded with the discrete sections 542, 582. The connecting portions 546, 586 are bumped outward in the illustrated embodiment.

Figure 17:
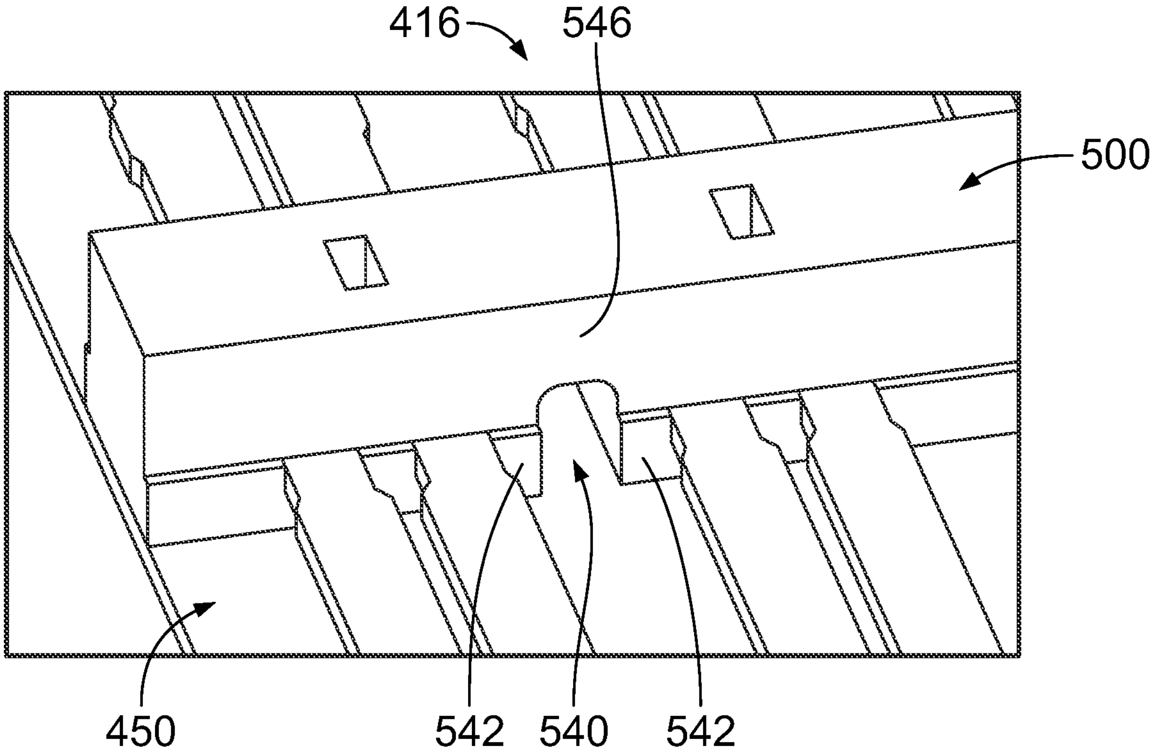
FIG. 17 is a top perspective view of a portion of the upper contact array in accordance with an exemplary embodiment showing the leadframe and the upper contact holders coupled to the upper ground shield.

FIG. 17 is a top perspective view of a portion of the upper contact array 416 in accordance with an exemplary embodiment showing the leadframe and the upper contact holders 500 coupled to the upper ground shield 450. FIG. 17 illustrates the connecting portion 546 between the discrete sections 542 over the forward slot 540. In the illustrated embodiment, the upper contact holder 500 is thicker than in the embodiment illustrated in FIG. 15. The connecting portion 546 is coplanar with the discrete sections 542 rather than being bumped outward.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contact assembly comprising:

a contact positioner having a central wall and a rear wall, the contact positioner including a front slot at a front of the contact positioner configured to receive a card edge of a module circuit board of a pluggable module; and a contact array coupled to the contact positioner, the contact array including contacts, the contacts including forward sections extending along the central wall and rearward sections extending along the rear wall, the forward sections of the contacts extending to the front slot to mate with the module circuit board, the forward sections and the rearward sections being oriented perpendicular to each other, the contact array including a ground shield having a ground plate extending along the forward sections of the contacts and a ground panel extending along the rearward sections of the contacts, the ground plate and the ground panel being oriented perpendicular to each other, the contact array including a forward contact holder and a rearward contact holder, the forward contact holder coupled to the ground plate and coupled to the forward sections of the contacts to locate the forward sections of the contacts relative to the ground plate, the forward contact holder including forward slots to separate the forward contact holder into discrete sections, the rearward contact holder coupled to the ground panel and coupled to the rearward sections of the contacts to locate the rearward sections of the contacts relative to the ground panel, the rearward contact holder including rearward slots to separate the rearward contact holder into discrete sections;

wherein the forward slots of the forward contact holder extend at least partially through the forward contact holder to form forward air trenches and the rearward slots of the rearward contact holder extend at least partially through the rearward contact holder to form rearward air trenches, the forward air trenches being located between the discrete sections, the forward air trenches being aligned with and located between the forward sections of the corresponding contacts, the rearward air trenches being located between the discrete sections, the rearward air trenches being aligned with and located between the rearward sections of the corresponding contacts.

2. The contact assembly of claim 1, wherein the contacts are arranged in pairs, the forward sections and the rearward sections of the forward contact holder and the rearward contact holder being arranged between the pairs of the contacts.

3. The contact assembly of claim 1, wherein the contacts are arranged in pairs, the discrete sections of the forward contact holder supporting respective pairs of the contacts, the discrete sections of the rearward contact holder supporting respective pairs of the contacts.

4. The contact assembly of claim 1, wherein the forward contact holder includes a central body, the first arms extending from a first side of the central body, and second arms extending from a second side of the central body, each of the first arms including at least one of the forward slots to form at least two of the discrete sections, each of the second arms including at least one of the forward slots to form at least two of the discrete sections.

5. The contact assembly of claim 1, wherein the forward slots of the forward contact holder extend entirely through the forward contact holder to completely separate the corresponding discrete sections, the rearward slots of the rearward contact holder extend entirely through the rearward contact holder to completely separate the corresponding discrete sections.

6. The contact assembly of claim 1, wherein the forward air trenches are open to the ground plate, the rearward air trenches being open to the ground panel.

7. The contact assembly of claim 1, wherein the forward contact holder includes mounting posts coupled to the ground plate and each of the discrete sections of the forward contact holder includes at least one of the mounting posts to secure the corresponding discrete section to the ground plate, the rearward contact holder including mounting posts coupled to the ground panel and each of the discrete sections of the rearward contact holder includes at least one of the mounting posts to secure the corresponding discrete section to the ground panel.

8. The contact assembly of claim 7, wherein the forward contact holder includes air core openings aligned with each of the mounting posts, the rearward contact holder includes air core openings aligned with each of the mounting posts.

9. The contact assembly of claim 1, wherein the contact assembly includes a plurality of the rearward contact holders at spaced apart locations along the rearward sections of the contacts.

10. The contact assembly of claim 1, wherein the forward contact holder extends between a first side and a second side, the forward slots of the forward contact holder forming discontinuities between the first side and the second side, the rearward contact holder extends between a first side and a second side, the rearward slots of the rearward contact holder forming discontinuities between the first side and the second side.

11. The contact assembly of claim 1, wherein the forward sections of the contacts are parallel to and spaced apart from the ground plate with the forward contact holder therebetween, the rearward sections of the contacts being parallel to and spaced apart from the ground panel with the rearward contact holder therebetween.

12. A card edge connector for mating with a pluggable module, the card edge connector comprising:

a housing including a top and a bottom, the housing having a front and a rear, the housing having a first side and a second side, the bottom configured to be mounted to a host circuit board, the housing including a cavity at the rear, the housing including a card slot open to the cavity at the front of the housing, the card slot configured to receive a card edge of a module circuit board of the pluggable module;

a contact assembly received in the cavity, the contact assembly having a contact positioner holding an upper contact array and a lower contact array;

the contact positioner having a central wall and a rear wall, the contact positioner received in the cavity and coupled to the housing, the contact positioner including a front slot aligned with the card slot to receive the card edge of the module circuit board;

an upper contact array coupled to the contact positioner, the upper contact array including upper contacts, the upper contacts including forward sections extending along the central wall and rearward sections extending along the rear wall, the forward sections of the upper contacts extending to the front slot to mate with the module circuit board, the forward sections and the rearward sections being oriented perpendicular to each other, the upper contact array including an upper ground shield having an upper ground plate extending along the forward sections of the upper contacts and an upper ground panel extending along the rearward sections of the upper contacts, the upper ground plate and the upper ground panel being oriented perpendicular to each other, the upper contact array including an upper forward contact holder and an upper rearward contact holder, the upper forward contact holder coupled to the upper ground plate and coupled to the forward sections of the upper contacts to locate the forward sections of the upper contacts relative to the upper ground plate, the upper forward contact holder including forward slots to separate the upper forward contact holder into discrete sections, the upper rearward contact holder coupled to the upper ground panel and coupled to the rearward sections of the upper contacts to locate the rearward sections of the upper contacts relative to the upper ground panel, the upper rearward contact holder including rearward slots to separate the upper rearward contact holder into discrete sections; and a lower contact array coupled to the contact positioner, the lower contact array including lower contacts, the lower contacts including forward sections extending along the central wall and rearward sections extending along the rear wall, the forward sections of the lower contacts extending to the front slot to mate with the module circuit board, the forward sections and the rearward sections being oriented perpendicular to each other, the lower contact array including a lower ground shield having a lower ground plate extending along the forward sections of the lower contacts and a lower ground panel extending along the rearward sections of the lower contacts, the lower ground plate and the lower ground panel being oriented perpendicular to each other, the lower contact array including a lower forward contact holder and a lower rearward contact holder, the lower forward contact holder coupled to the lower ground plate and coupled to the forward sections of the lower contacts to locate the forward sections of the lower contacts relative to the lower ground plate, the lower forward contact holder including forward slots to separate the lower forward contact holder into discrete sections, the lower rearward contact holder coupled to the lower ground panel and coupled to the rearward sections of the lower contacts to locate the rearward sections of the lower contacts relative to the lower ground panel, the lower rearward contact holder including rearward slots to separate the lower rearward contact holder into discrete sections.

13. The card edge connector of claim 12, wherein the upper contacts are arranged in pairs, the forward sections and the rearward sections of the upper forward contact holder and the upper rearward contact holder being arranged between the pairs of the upper contacts, wherein the lower contacts are arranged in pairs, the forward sections and the rearward sections of the lower forward contact holder and the lower rearward contact holder being arranged between the pairs of the lower contacts.

14. The card edge connector of claim 12, wherein the upper contacts are arranged in pairs, the discrete sections of the upper forward contact holder supporting respective pairs of the upper contacts, the discrete sections of the upper rearward contact holder supporting respective pairs of the upper contacts, and wherein the lower contacts are arranged in pairs, the discrete sections of the lower forward contact holder supporting respective pairs of the lower contacts, the discrete sections of the lower rearward contact holder supporting respective pairs of the lower contacts.

15. The card edge connector of claim 12, wherein the upper forward contact holder includes a central body, the first arms extending from a first side of the central body, and second arms extending from a second side of the central body, each of the first arms including at least one of the forward slots to form at least two of the discrete sections, each of the second arms including at least one of the forward slots to form at least two of the discrete sections.

16. The card edge connector of claim 12, wherein the upper forward contact holder includes mounting posts coupled to the upper ground plate and each of the discrete sections of the upper forward contact holder includes at least one of the mounting posts to secure the corresponding discrete section to the upper ground plate, the upper rearward contact holder including mounting posts coupled to the upper ground panel and each of the discrete sections of the upper rearward contact holder includes at least one of the mounting posts to secure the corresponding discrete section to the upper ground panel, and wherein the lower forward contact holder includes mounting posts coupled to the lower ground plate and each of the discrete sections of the lower forward contact holder includes at least one of the mounting posts to secure the corresponding discrete section to the lower ground plate, the lower rearward contact holder including mounting posts coupled to the lower ground panel and each of the discrete sections of the lower rearward contact holder includes at least one of the mounting posts to secure the corresponding discrete section to the lower ground panel.

17. The card edge connector of claim 12, wherein the upper contact assembly includes a plurality of the upper rearward contact holders at spaced apart locations along the rearward sections of the upper contacts, and wherein the lower contact assembly includes a plurality of the lower rearward contact holders at spaced apart locations along the rearward sections of the lower contacts.

18. The card edge connector of claim 12, wherein the upper forward contact holder extends between a first side and a second side, the forward slots of the upper forward contact holder forming discontinuities between the first side and the second side, the upper rearward contact holder extends between a first side and a second side, the rearward slots of the upper rearward contact holder forming discontinuities between the first side and the second side, and wherein the lower forward contact holder extends between a first side and a second side, the forward slots of the lower forward contact holder forming discontinuities between the first side and the second side, the lower rearward contact holder extends between a first side and a second side, the rearward slots of the lower rearward contact holder forming discontinuities between the first side and the second side.

19. The card edge connector of claim 12, wherein the forward sections of the upper contacts are parallel to and spaced apart from the upper ground plate with the upper forward contact holder therebetween, the rearward sections of the upper contacts being parallel to and spaced apart from the upper ground panel with the upper rearward contact holder therebetween, and wherein the forward sections of the lower contacts are parallel to and spaced apart from the lower ground plate with the lower forward contact holder therebetween, the rearward sections of the lower contacts being parallel to and spaced apart from the lower ground panel with the lower rearward contact holder therebetween.

20. A card edge connector for mating with a pluggable module, the card edge connector comprising:

a housing including a top and a bottom, the housing having a front and a rear, the housing having a first side and a second side, the bottom configured to be mounted to a host circuit board, the housing including a cavity at the rear, the housing including an inner contact channel and an outer contact channel, the inner contact channel closer to the bottom and the host circuit board, the housing including an inner card slot open to the inner contact channel at the front of the housing, the housing including an outer card slot open to the outer contact channel at the front of the housing, the inner and outer card slots configured to receive card edges of module circuit boards of the stacked pluggable modules;

an inner contact assembly received in the cavity, the inner contact assembly having an inner contact positioner holding inner contacts, the inner contact positioner is positioned in the inner contact channel aligned with the inner card slot to receive the card edge of the module circuit board, the inner contacts configured to be electrically connected to the host circuit board and configured to be electrically connected to the corresponding module circuit board; and an outer contact assembly received in the cavity, the outer contact assembly having an outer contact positioner holding outer contacts in an upper contact array and a lower contact array, the outer contacts configured to be electrically connected to the host circuit board and configured to be electrically connected to the corresponding module circuit board, the outer contact positioner including a front slot aligned with the outer card slot to receive the card edge of the corresponding module circuit board, the upper contact array including upper contacts arranged in pairs, an upper ground shield, and an upper contact holder holding the upper contacts relative to the upper ground shield, the upper contact holder including slots to separate the upper contact holder into discrete sections each supporting one of the pairs of the upper contacts, the slots located between the pairs of the upper contacts, the lower contact array including lower contacts arranged in pairs, a lower ground shield, and a lower contact holder holding the lower contacts relative to the lower ground shield, the lower contact holder including slots to separate the lower contact holder into discrete sections each supporting one of the pairs of the lower contacts, the slots located between the pairs of the lower contacts.

21. A contact assembly comprising:

a contact positioner having a central wall and a rear wall, the contact positioner including a front slot at a front of the contact positioner configured to receive a card edge of a module circuit board of a pluggable module;

an upper contact array coupled to the contact positioner, the upper contact array including upper contacts, the upper contacts including forward sections extending along the central wall and rearward sections extending along the rear wall, the forward sections of the upper contacts extending to the front slot to mate with the module circuit board, the forward sections and the rearward sections being oriented perpendicular to each other, the upper contact array including an upper ground shield having an upper ground plate extending along the forward sections of the upper contacts and an upper ground panel extending along the rearward sections of the upper contacts, the upper ground plate and the upper ground panel being oriented perpendicular to each other, the upper contact array including an upper forward contact holder and an upper rearward contact holder, the upper forward contact holder coupled to the upper ground plate and coupled to the forward sections of the upper contacts to locate the forward sections of the upper contacts relative to the upper ground plate, the upper forward contact holder including forward slots to separate the upper forward contact holder into discrete sections, the upper rearward contact holder coupled to the upper ground panel and coupled to the rearward sections of the upper contacts to locate the rearward sections of the upper contacts relative to the upper ground panel, the upper rearward contact holder including rearward slots to separate the upper rearward contact holder into discrete sections; and a lower contact array coupled to the contact positioner, the lower contact array including lower contacts, the lower contacts including forward sections extending along the central wall and rearward sections extending along the rear wall, the forward sections of the lower contacts extending to the front slot to mate with the module circuit board, the forward sections and the rearward sections being oriented perpendicular to each other, the lower contact array including a lower ground shield having a lower ground plate extending along the forward sections of the lower contacts and a lower ground panel extending along the rearward sections of the lower contacts, the lower ground plate and the lower ground panel being oriented perpendicular to each other, the lower contact array including a lower forward contact holder and a lower rearward contact holder, the lower forward contact holder coupled to the lower ground plate and coupled to the forward sections of the lower contacts to locate the forward sections of the lower contacts relative to the lower ground plate, the lower forward contact holder including forward slots to separate the lower forward contact holder into discrete sections, the lower rearward contact holder coupled to the lower ground panel and coupled to the rearward sections of the lower contacts to locate the rearward sections of the lower contacts relative to the lower ground panel, the lower rearward contact holder including rearward slots to separate the lower rearward contact holder into discrete sections.

* * * * *